US011403376B2

(12) United States Patent
Eramian et al.

(10) Patent No.: US 11,403,376 B2
(45) Date of Patent: Aug. 2, 2022

(54) AUTHENTICATING ACTIVITIES OF ACCOUNTS

(71) Applicant: PayPal, Inc., San Jose, CA (US)

(72) Inventors: David Edward Eramian, Mountain View, CA (US); Michael Charles Todasco, Santa Clara, CA (US); Sumeet Ahuja, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 186 days.

(21) Appl. No.: 16/516,879

(22) Filed: Jul. 19, 2019

(65) Prior Publication Data

US 2020/0053075 A1 Feb. 13, 2020

Related U.S. Application Data

(63) Continuation of application No. 15/436,695, filed on Feb. 17, 2017, now Pat. No. 10,362,027, which is a continuation of application No. 14/584,425, filed on Dec. 29, 2014, now Pat. No. 9,576,120.

(51) Int. Cl.
| | |
|---|---|
| *G06F 21/31* | (2013.01) |
| *G06F 21/35* | (2013.01) |
| *H04W 12/065* | (2021.01) |
| *G06Q 20/40* | (2012.01) |
| *H04L 9/40* | (2022.01) |
| *H04L 67/50* | (2022.01) |
| *H04L 67/306* | (2022.01) |
| *H04W 12/08* | (2021.01) |
| *H04W 4/02* | (2018.01) |

(52) U.S. Cl.
CPC ............ *G06F 21/316* (2013.01); *G06F 21/35* (2013.01); *G06Q 20/401* (2013.01); *H04L 63/0853* (2013.01); *H04L 63/107* (2013.01); *H04L 67/22* (2013.01); *H04L 67/306* (2013.01); *H04W 4/02* (2013.01); *H04W 12/065* (2021.01); *H04W 12/08* (2013.01)

(58) Field of Classification Search
CPC .......... G06F 21/30; G06F 21/31; G06F 21/32; G06F 21/35; G06F 21/316; G06F 21/606
See application file for complete search history.

(56) References Cited

U.S. PATENT DOCUMENTS

| | | |
|---|---|---|
| 8,800,034 B2 | 8/2014 | McHugh et al. |
| 8,918,903 B1 | 12/2014 | Schepis et al. |
| 8,978,130 B2 | 3/2015 | Handler |

(Continued)

*Primary Examiner* — Dao Q Ho
(74) *Attorney, Agent, or Firm* — Haynes and Boone, LLP

(57) ABSTRACT

A system, a medium, and a method involve a communication interface of a server device that receives first activity data associated with a first activity of an account and second activity data associated with a second activity of the account. A processor of the server device determines a first location of the first activity from the first activity data and a second location of the second activity from the second activity data. An authentication circuit of the server device determines a first authentication of the first activity based at least on the first activity data. The authentication circuit determines a second authentication of the second activity based on at least one of the first authentication, the first location, and the second location. A transmitter of the communication interface transmits an indication of the second authentication to a client device.

20 Claims, 12 Drawing Sheets

(56) References Cited

U.S. PATENT DOCUMENTS

| | | | |
|---|---|---|---|
| 9,139,091 B1* | 9/2015 | Penilla | B60L 1/02 |
| 9,172,719 B2 | 10/2015 | Fontenot et al. | |
| 9,576,120 B2 | 2/2017 | Eramian et al. | |
| 10,362,027 B2 | 7/2019 | Eramian et al. | |
| 2009/0043681 A1* | 2/2009 | Shoji | G06Q 40/00 |
| | | | 705/35 |
| 2012/0047560 A1* | 2/2012 | Underwood | G06F 21/30 |
| | | | 726/4 |
| 2012/0233000 A1* | 9/2012 | Fisher | G06T 7/70 |
| | | | 705/14.71 |
| 2012/0233023 A1* | 9/2012 | Chehade | G06Q 30/06 |
| | | | 705/26.41 |
| 2012/0253485 A1* | 10/2012 | Weast | A63B 24/0059 |
| | | | 700/91 |
| 2012/0290950 A1* | 11/2012 | Rapaport | H04N 21/8358 |
| | | | 715/753 |
| 2013/0104198 A1* | 4/2013 | Grim | H04W 4/023 |
| | | | 726/4 |
| 2013/0340052 A1* | 12/2013 | Jakobsson | H04L 63/08 |
| | | | 726/5 |
| 2014/0068723 A1* | 3/2014 | Grim | H04W 12/06 |
| | | | 726/4 |
| 2014/0089673 A1* | 3/2014 | Luna | A61B 5/681 |
| | | | 713/186 |
| 2014/0150068 A1* | 5/2014 | Janzer | H04L 63/20 |
| | | | 726/4 |
| 2014/0198687 A1* | 7/2014 | Raleigh | G06Q 30/04 |
| | | | 370/259 |
| 2015/0170531 A1* | 6/2015 | Hu | G09B 5/00 |
| | | | 434/236 |
| 2015/0177362 A1* | 6/2015 | Gutierrez | G08B 21/24 |
| | | | 701/519 |
| 2015/0227725 A1* | 8/2015 | Grigg | H04L 63/126 |
| | | | 726/7 |
| 2015/0310434 A1* | 10/2015 | Cheung | H04W 12/06 |
| | | | 705/44 |
| 2015/0326442 A1* | 11/2015 | Li | H04W 40/244 |
| | | | 709/223 |
| 2016/0182486 A1* | 6/2016 | Wu | G06F 21/6209 |
| | | | 726/28 |
| 2016/0188849 A1 | 6/2016 | Eramian et al. | |
| 2017/0295170 A1 | 10/2017 | Eramian et al. | |
| 2020/0012771 A1* | 1/2020 | Shah | H04L 9/3231 |

* cited by examiner

AUTHENTICATING ACTIVITIES OF ACCOUNTS

CROSS REFERENCE

This application is a continuation of U.S. patent application Ser. No. 15/436,695, filed Feb. 17, 2017, which is a continuation of U.S. patent application Ser. No. 14/584,425, filed Dec. 29, 2014, now U.S. Pat. No. 9,576,120, all of which are hereby incorporated by reference in their entirety.

TECHNICAL FIELD

This disclosure relates to authenticating one or more activities of an account, and more particularly, to computing devices configured to determine authentications of one or more activities.

BACKGROUND

Some examples of accounts may include financial accounts, e-mail accounts, social networking accounts, e-commerce accounts, accounts with service providers, and/or other types of accounts. Various technologies may evaluate activities of an account. In some instances, passwords, ciphers, digital keys, and/or other codes may validate the activities of the account. For example, an automated teller machine (ATM) may be configured to receive ATM card data and a personal identification number (PIN) to identify a financial account and validate activities of the account. Further, a fuel dispenser machine at a gas station may be configured to receive credit card data and a zip code to identify a financial account and validate fuel purchases made with the account.

In some instances, a user may have to keep track of multiple ATM cards, credit cards, identification cards, passwords, PIN numbers, zip codes, and/or other forms of account data to validate activities of one or more accounts. In addition, the user may be required to periodically change such cards, passwords, codes, and/or accounts to prevent unauthorized activities by other users. As such, it may be necessary to keep track of multiple changes to such cards, passwords, codes, and/or accounts, possibly requiring data maintenance, security, and/or protection of such accounts. In some embodiments, various sophisticated technologies may be implemented to reduce and/or eliminate the need for such requirements.

Figure 1:
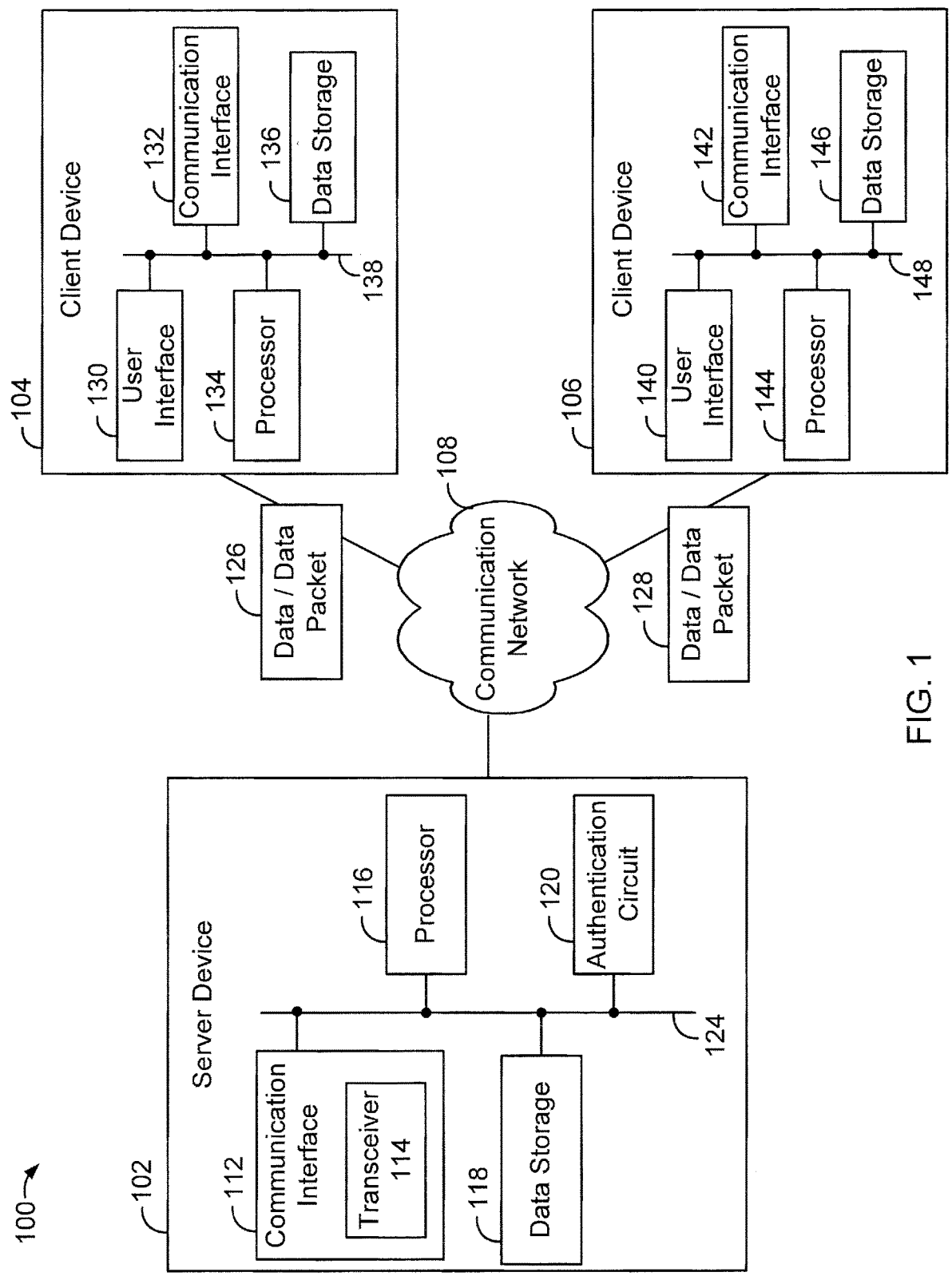
FIG. 1 is a simplified block diagram of an example system, according to an embodiment.

Embodiments of the present disclosure and their advantages are best understood by referring to the detailed description that follows. It should be appreciated that reference numerals are used to identify elements illustrated in one or more of the figures, where showings therein are for purposes of illustrating embodiments of the present disclosure and not for purposes of limitation.

DETAILED DESCRIPTION

In some embodiments, various activities of a user's account may be authenticated. In some instances, the activities may be authenticated based on a location of the user's smartphone. For example, consider a scenario where the user carries the smartphone from a home to a nearby vehicle. As such, an authentication system may receive location data indicating that the user is leaving the home location and carrying the smartphone to the nearby vehicle. Further, the system may identify a route of the smartphone from the home location to an ATM machine a few miles away. The system may further identify the route is often taken to access the user's account with the ATM machine. The system may also identify the ATM machine as one regularly used to access the user's account. Based on the identified route, the user swiping an ATM card at the ATM machine and entering a valid PIN number, the system may determine a successful authentication of the user's activity, enabling the ATM machine to access the user's account. Yet, in some instances, the system may determine a successful authentication based on the identified route, the identified ATM machine, and a valid PIN number, thereby circumventing the need to swipe the card at the ATM machine. As such, the user may securely access the account without having to swipe the card to access the account, let alone having to carry the card.

In some embodiments, the system may authenticate activities of the account based on various confidence levels. For example, considering the scenario above, the system may determine a confidence level to authenticate additional activities of the account based on the identified route to the ATM machine and the successful authentication at the ATM machine. In another scenario, consider the system identifies a change in the location of the smartphone to a nearby gas station regularly used to purchase fuel with the user's account. In some instances, the system may enable the user to purchase fuel at the gas station based on the determined confidence level. For example, the system may enable a fuel dispenser to allow a fuel purchase by receiving biometric data from the user. Thus, the user may press a finger on a fingerprint sensor of the dispenser machine and begin refueling the user's vehicle. Thus, based on determined confidence levels, the system may authenticate activities through biometric data, thereby allowing the user to refuel the vehicle without carrying ATM cards and/or credit cards. Further, the system may authenticate activities of the account without prompting the user for a PIN number, a zip code, a password, and/or other forms of account data.

In some embodiments, the authentication system may authenticate activities of multiple related accounts. For example, considering one or more scenarios above, the system may identify a change in location of the user's smartphone to a shopping mall location. Further, the system may receive location data from another smartphone, e.g., a smartphone carried by the user's spouse, indicating the spouse's smartphone is also located at the shopping mall. In some instances, based on the close proximity of the user's smartphone to the spouse's smartphone, the system may determine a confidence level to authenticate additional activities of the user's account and/or the spouse's account. The system may enable the stores in the shopping mall to allow the spouse to make purchases based on the spouse's biometric data. For example, the stores may allow purchases by receiving data corresponding to a single thumbprint from the spouse, thereby allowing the spouse to shop without carrying ATM cards, credit cards, driver's licenses, and/or other cards. Further, the system may authenticate activities of the spouse's account without requiring a PIN number, a zip code, a password, and/or other forms of account data.

In some embodiments, various types of data may include activity data, authentication data, biometric data, location data, and/or other types of data. In some instances, various types of data may be represented by packets of data, possibly referred to as "data packets." In some instances, a server may manage data packets indicative of activities of accounts, and the server may transmit data packets to a client device (e.g., a smartphone). For example, consider one or more scenarios above where a smartphone is moved from the home location to the location of the vehicle. In such instances, a server device may receive activity data associated with the smartphone moving from the home location to the vehicle location. Further, the server device may transmit to the smartphone activity data indicating the change in locations. As such, the activity data may be shown on a display of the smartphone.

FIG. 1 is a simplified block diagram of an example system 100, according to an embodiment. As shown, the system 100 includes multiple computing devices, such as a server device 102, a client device 104, a client device 106, and/or other computing devices. The server device 102 may be configured to support, operate, run, and/or manage various forms of activity data, authentication data, biometric data, location data, and/or other types of data. As such, also included in the system 100 is a communication network 108. The system 100 may operate with more or less than the computing devices shown in FIG. 1, possibly communicating with such devices via a communication network 108. In various embodiments, the server device 102, the client device 104, and/or the client device 106 may be configured to communicate via the communication network 108.

In some embodiments, the communication network 108 may be a packet-switched network configured to provide digital networking communications and exchange data of various forms, content, type, and/or structure. The communication network 108 may correspond to small scale communication networks, such as a private or local area network, or a larger scale network, such as a wide area network or the Internet, accessible by the various computing devices of the system 100. The communication network 108 may include network adapters, switches, routers, network nodes, and various buffers and queues to exchange data packets.

For example, the communication network 108 may be configured to exchange data packets such as a first data packet 126 and/or a second data packet 128 including activity data, authentication data, biometric data, location data, and/or other types of data. The communication network 108 may exchange data packets between the server device 102, the client device 104, and/or the client device 106 using various protocols such as Transmission Control Protocol/Internet Protocol (TCP/IP), among other possibilities.

In some embodiments, the system 100 may also include other computing devices and/or software configured to perform various operations in accordance with this disclosure and illustrated by the accompanying figures. For example, the system 100 may include other client devices, servers including stand-alone and/or enterprise-class servers, servers implementing one or more operating systems such as a client- and/or server-based operating systems. It can be appreciated that the client devices and/or server devices illustrated in FIG. 1 may be deployed in other ways and that the operations performed and/or the services provided by such devices may be combined or separated for a given embodiment and may be performed by a greater number or a fewer number of devices and/or server devices. One or more devices and/or server devices may be operated and/or maintained by the same or different entities.

In some embodiments, the system 100 may include the server device 102 configured to perform various implementations in accordance with this disclosure and illustrated by the accompanying figures. For example, the server device 102 may be configured to receive and/or access activity data associated with various activities of an account. Further, the server device 102 may be configured to receive and/or access activity data associated with various activities of multiple accounts. For example, the server device 102 may be configured to receive and/or access location data identifying the locations of the client device 104 and/or 106.

In some embodiments, an "account" and/or a "user account" may be a compilation of data associated with activities. As noted, some examples of accounts may include financial accounts, e-mail accounts, social networking accounts, e-commerce accounts, smartphone accounts, and/or accounts with service providers, among other possibilities. For example, an account for a particular user may include data related to the user's activities and/or data representing the user. The user may provide various types of information to the account. The account may be displayed on a computing device, such as a smartphone, a laptop computer, and/or a wearable computing device that may be used to access the account. The user may operate the computing device and their account may be managed on the computing device. For example, the computing device may receive data, send data, and/or store data associated with the account. For example, details regarding various activities may be viewed on the computing device. Further, various types of data may be provided to authenticate the account and payment information may be provided secure transactions with the account.

In some embodiments, the account may gather data regarding the user and compile the data into the user's account. In particular, the account may track previous activities associated with the account, locations of the activities, purchases made with the account, and/or other forms of activity data indicative of future activities that may be associated with the account. Further, the account may track how long it takes the user to participate in activities, e.g., shopping and/or purchasing items. The account may also provide recommendations to the user based on the information stored in the user's account.

In some embodiments, an account may be created by one or more users. Further, the account may be created by applications, web sites, and/or other services, for instance. Thus, various users may have access to a particular account. The user may be an entity, and/or a corporation, among other possibilities. For example, the user may be a corporation with access to a corporate account, possibly for its employees and/or contractors. Yet further, a user may be a computing device, a computing system, a robotic system, and/or another form of technology capable of sending and receiving information using the account. A user may provide a login, a password, a code, authentication data, biometric data, and/or other types of data to access the account.

In some embodiments, a user may have a single account providing a representation of the user for various websites, applications, and/or other services. For example, a user could opt to use their e-mail account or social network account as a multi-purpose account to use and/or access financial accounts, e-commerce accounts, service accounts and/or other types of accounts. For example, a single account may be used to perform various activities and/or services. For example, the account may track locations of the user, enable withdrawals and/or deposits of cash via an ATM machine, allow purchasing of store items, and/or enable other activities. In some instances, the user may be prompted for various types of authentication data and submit the requisite data to proceed with the account activities.

In some embodiments, the server device 102 may take a variety of forms and may include various components, including for example, a communication interface 112, a transceiver 114, a processor 116, a data storage 118, an authentication circuit/component 120, and/or other circuits/components, any of which may be communicatively linked to the other modules via a system bus, network, or other connection mechanism 124.

The communication interface 112 may take a variety of forms and may be configured to allow the server device 102 to communicate with one or more devices according to any number of protocols. For example, the communication interface 112 may include the transceiver 114 configured to allow the server device 102 to communicate with the client devices 104 and/or 106 via communication network 108. In one example, the communication interface 112 and/or the transceiver 114 may take the form of a wired interface, such as an Ethernet interface. As another example, the communication interface 112 and/or the transceiver 114 may take the form of a wireless interface, such as a cellular interface, a WI-FI interface, another short-range, point-to-multipoint voice and/or data transfer communication interface, such as BLUETOOTH. In some instances, the communication interface 112 may send/receive activity data to/from client devices 104 and/or 106.

The processor 116 may include or take the form of a general purpose processor, e.g., a microprocessor. Further, the processor 116 may include a special purpose processor such as a digital signal processor (DSP), an application specific integrated circuit (ASIC), a programmable system on chip, and/or another processing component configured to process activity data, authentication data, biometric data, location data, and/or other types of data. As such, the processor 116 may receive data and/or data packet 126 via the communication network 108. Further, the processor 116 may access data and/or data packet 128 received by the server device 102. For example, the data packet 126 and the data packet 128 may be transmitted over communication network 108. Further, the data packets 126 and 128 may include IP addresses of client device 104 and 106, respectively. Yet further, the data packets 126 and/or 128 may also include data in protocols such as Transmission Control Protocol/Internet Protocol (TCP/IP). In various embodiments, each of packets 126 and 128 may include 1,000 to 1,500 bytes, among other possible data capacity ranges.

The data storage 118 may include one or more volatile, non-volatile, removable, and/or non-removable storage components, such as magnetic, optical, or flash storage, and may be integrated in whole or in part with processor 116. Further, the data storage 116 may include or take the form of a non-transitory computer-readable storage medium, having stored thereon machine-readable instructions (e.g., compiled or non-compiled program logic and/or machine code) that, when executed by server device 102, cause the server device 102 to perform operations, such as those described in this disclosure and illustrated by the accompanying figures.

The processor 116 may determine one or more locations of activities from activity data. Further, the processor 116 may determine that activity data includes authentication data such as biometric data. In some instances, the processor 116 may include pre-configured and/or dedicated circuits of server device 102. Further, the processor 116 may include circuits and/or hardware components configured to carry out operations in accordance with this disclosure and illustrated by the accompanying figures. For example, the processor 116 may determine from the data 126 a first location of a first activity. Yet further, the processor 116 may determine from the data 128 a second location of a second activity.

The authentication circuit and/or component 120 may determine various authentications of activities based on authentication data such as biometric data. The authentication circuit and/or component 120 may also determine relationships between accounts. The authentication circuit and/or component 120 may also determine authentication schemes to authenticate activities of accounts. In some instances, the authentication circuit and/or component 120 may include pre-configured circuits, dedicated circuits, and/or hardware components of server device 102 to determine authentication data, relationships, authentication schemes, authentications of activities, and/or other data related to authenticating activities of accounts. Further, the authentication circuit and/or component 120 may include circuits and/or hardware components configured to carry out operations in accordance with this disclosure and illustrated by the accompanying figures. For example, the authentication circuit and/or component 120 may determine a first authentication of a first activity based on the first activity data 126 and a second authentication of a second activity based on the second activity data 128.

As with server device 102, client devices 104 and 106 may be configured to perform a variety of operations such as those described in this disclosure and illustrated by the accompanying figures. For example, client devices 104 and 106 may be configured to exchange activity data with the server device 102 such as data 126 and 128 indicating activities associated with accounts. Client devices 104 and 106 may take a variety of forms, including for example, a personal computer (PC), a smartphone, a wearable computer, a laptop/tablet computer, a merchant device, a smart watch with appropriate computer hardware resources, a head-mountable display, other types of wearable devices, and/or other types of computing devices capable of transmitting and/or receiving data, among other possibilities. Client devices 104 and 106 may include various components, including, for example, user interfaces 130 and 140, communication interfaces 132 and 142, processors 134 and 144, and/or data storages 136 and 146, respectively, all of which may be communicatively linked with each other via a system bus, network, or other connection mechanisms 138 and 148, respectively.

User interfaces 130 and 140 may be configured for facilitating interaction between client devices 104 and 106 and users of client devices 104 and 106. For example, user interfaces 130 and/or 140 may be configured to receive inputs from respective users and providing outputs accordingly. In some instances, the user interfaces 130 and 140 may include input components such as a touchscreen, a touch sensitive panel, a microphone for receiving voice commands, a computer mouse, a keyboard, and/or other input components. In addition, user interfaces 130 and 140 may include output components such as displays possibly with touchscreen inputs, a sound speaker and/or other audio output mechanism, a haptic feedback system, and/or other output components.

In some embodiments, communication interfaces 132 and 142 may take a variety of forms and may be configured to allow client devices 104 and 106, respectively, to communicate with one or more devices according to any number of protocols. For instance, communication interfaces 132 and 142 may be configured to allow client devices 104 and 106, respectively, to communicate with the server device 102 via the communication network 108.

Processors 134 and 144 may include general purpose processors and/or special purpose processors. Data storages 136 and 146 may include one or more volatile, non-volatile, removable, and/or non-removable storage components, and may be integrated in whole or in part with processors 134 and 144, respectively. Further, data storages 136 and 146 may take the form of non-transitory computer-readable storage mediums, having stored thereon machine-readable instructions that, when executed by processors 134 and 144, cause client devices 104 and 106 to perform operations, respectively, such as those described in this disclosure and illustrated by the accompanying figures. Such machine-readable instructions may define or be part of a discrete software application, such a native app and/or web app that can be executed upon user input.

Figure 2A:
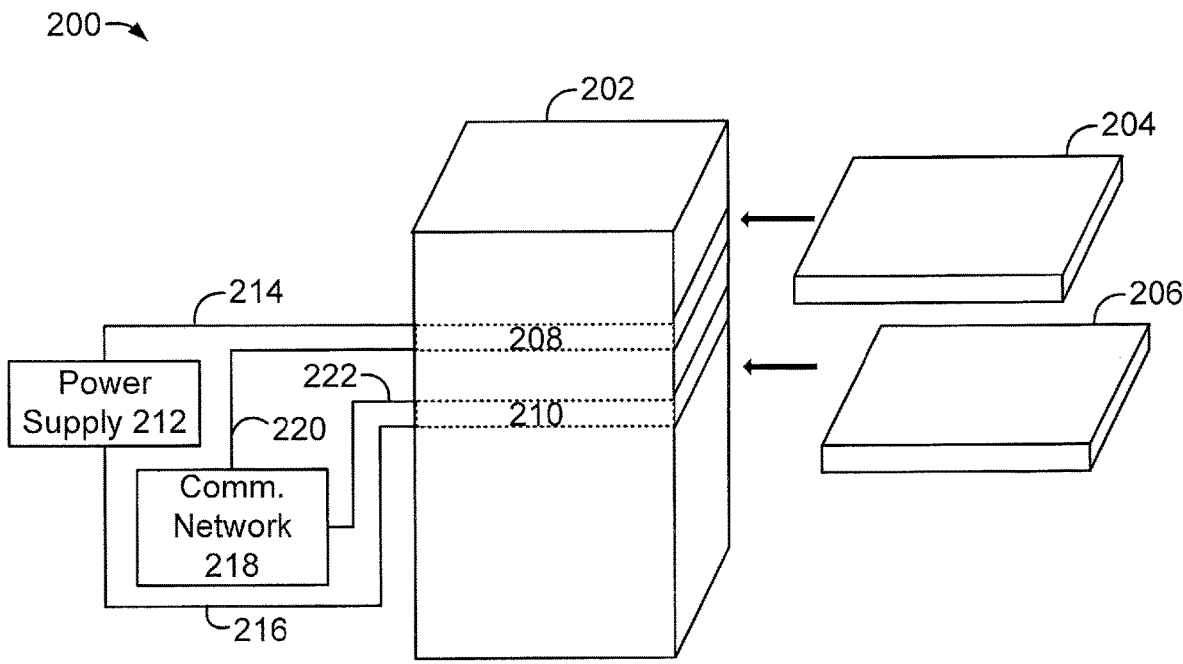
FIG. 2A provides an exemplary server device configured to support a set of trays, according to an embodiment.

FIG. 2A is an exemplary server device 200 configured to support a set of trays, according to an embodiment. The server device 200 may, for example, take the form of the server device 102 described above in relation to FIG. 1. Further, the server device 200 may be configured to support, operate, run, and/or manage activity data, authentication data, biometric data, location data, and/or other types of data.

As shown, the server device 200 may include a chassis 202 that may support trays 204 and 206, and possibly multiple other trays as well. The chassis 202 may include slots 208 and 210 configured to hold the trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204. For example, the tray 204 may be inserted into the slot 208 and the tray 206 may be inserted into the slot 210. Further, during operation of the server device 200, the trays 204 and 206 may be removed from the slots 208 and 210, respectively. Yet further, the tray 204 may be inserted into the slot 210 and the tray 206 may be inserted into slot 208, and the server device 200 may continue various operations.

The chassis 202 may be connected to a power supply 212 via connections 214 and 216 to supply power to the slots 208 and 210, respectively. The chassis 202 may also be connected to communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into slots 210 and 208, respectively, and power supply 212 may supply power to trays 204 and 206 via connections 216 and 214, respectively. Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively.

The communication network 218 may, for example, take the form of communication network 108 described above in relation to FIG. 1. In some embodiments, communication network 218 may provide a network port, a network hub, a network switch, or a network router that may be connected to a telephone, Ethernet, or an optical communication link, among other possibilities.

Figure 2B:
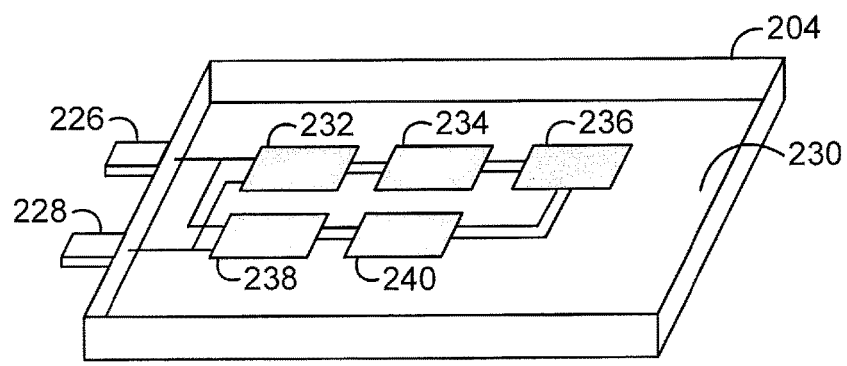
FIG. 2B provides an exemplary tray configured to support one or more server components, according to an embodiment.

FIG. 2B illustrates an exemplary tray 204 configured to support one or more server components, according to an embodiment. The tray 204 may, for example, take the form of tray 204 described above in relation to FIG. 2A. Further, the tray 206 may also take the form of the tray 204. As shown in FIG. 2B, the tray 204 may include a tray base 230 that may be the bottom surface of the tray 204 configured to support multiple circuits and/or circuit components such as a main computing board connecting various other components. The tray 204 may include a connector 226 that may link to the connections 214 or 216 to supply power to the tray 204. The tray 204 may also include a connector 228 that may link to the connections 220 or 222 to provide network connectivity to the tray 204. The connectors 226 and 228 may be positioned on the tray 204 such that upon inserting the tray 204 into the slot 208, the connectors 226 and 228 couple directly with the connections 214 and 220, respectively. Further, upon inserting tray 204 into slot 210, connectors 226 and 228 may couple directly with connections 216 and 222, respectively.

The tray 204 may include components 232, 234, 236, 238, and 240. In some instances, a communication interface 232, a transceiver 234, a processor 236, data storage 238, and an authentication circuit and/or component 240 may, for example, take the form of the communication interface 112, the transceiver 114, the processor 116, the data storage 118, and the authentication circuit and/or component 120, respectively. As such, the tray 204 may provide power and network connectivity to each of components 232-240. In some embodiments, one or more of the components 232-240 may be provided via one or more circuits and/or components that include resistors, inductors, capacitors, voltage sources, current sources, switches, logic gates, registers, and/or a variety of other circuit elements. One or more of the circuit elements in a circuit may be configured to provide the circuit(s) that cause one or more of the components 232-240 to perform the operations described herein. As such, in some embodiments, preconfigured and dedicated circuits may be implemented to perform the operations of the components 232-240. In other embodiments, a processing system may execute instructions on a non-transitory, computer-readable medium to configure one or more circuits to perform operations described herein and illustrated by the accompanying figures.

Any of the circuits and/or components 232-240 may be combined to take the form of one or more general purpose processors, microprocessors, and/or special purpose processors, among other types of processors. For example, one or more of the communication interface 232, the transceiver 234, the processor 236, the data storage 238, and the authentication circuit and/or component 240 may be combined, possibly such that the communication interface 232, the transceiver 234, the data storage 238, and the authentication circuit and/or component 240 are combined with or within the processor 236. Further, the combined processor 236 may take the form of one or more processors, microprocessors, special purpose processors, DSPs, GPUs, FPUs, network processors, and/or ASICs, among other types of processing components. Yet further, the combined processor 236 may be configured to carry out various operations of the communication interface 232, the transceiver 234, the data storage 238, and the authentication circuit and/or component 240.

In some embodiments, the communication interface 232 of the server device 202 may receive first activity data associated with a first activity of an account and second activity data associated with a second activity of the account. The first and second activities may occur at different times. The processor 236 of the server device 202 may determine a first location of the first activity from the first activity data and a second location of the second activity from the second activity data. For example, the processor 236 may identify GPS data in the first and second activity data to determine the first and second locations, respectively. The authentication circuit and/or component 240 of the server device may determine a first authentication of the first activity based at least on the first activity data. For example, the first activity data may include ATM card data from swiping a valid card and entering a valid pin number. Further, the authentication circuit and/or component 240 may determine a second authentication of the second activity based on at least one of the first authentication, the first location, and the second location. The transceiver 234 of the communication interface may transmit an indication of the second authentication to a client device, e.g., a smartphone.

In some embodiments, the communication interface 232 of the server device 202 may receive a selection of an authentication scheme to authenticate activities of an account. Further, the communication interface 232 may receive activity data associated with a given activity of the account. The processor 236 of the server device 202 may determine the activity data includes biometric data to authenticate the given activity of the account. The authentication circuit and/or component 240 of the server device 202 may determine the authentication scheme is selected from a number of authentication schemes, where the selected authentication scheme requires the biometric data to authenticate the activities of the account. Further, the authentication circuit and/or component 240 may determine an authentication of the given activity based at least on the biometric data. The transceiver 234 of the communication interface 232 may transmit an indication of the authentication to a client device such as the smartphone.

Figure 3:
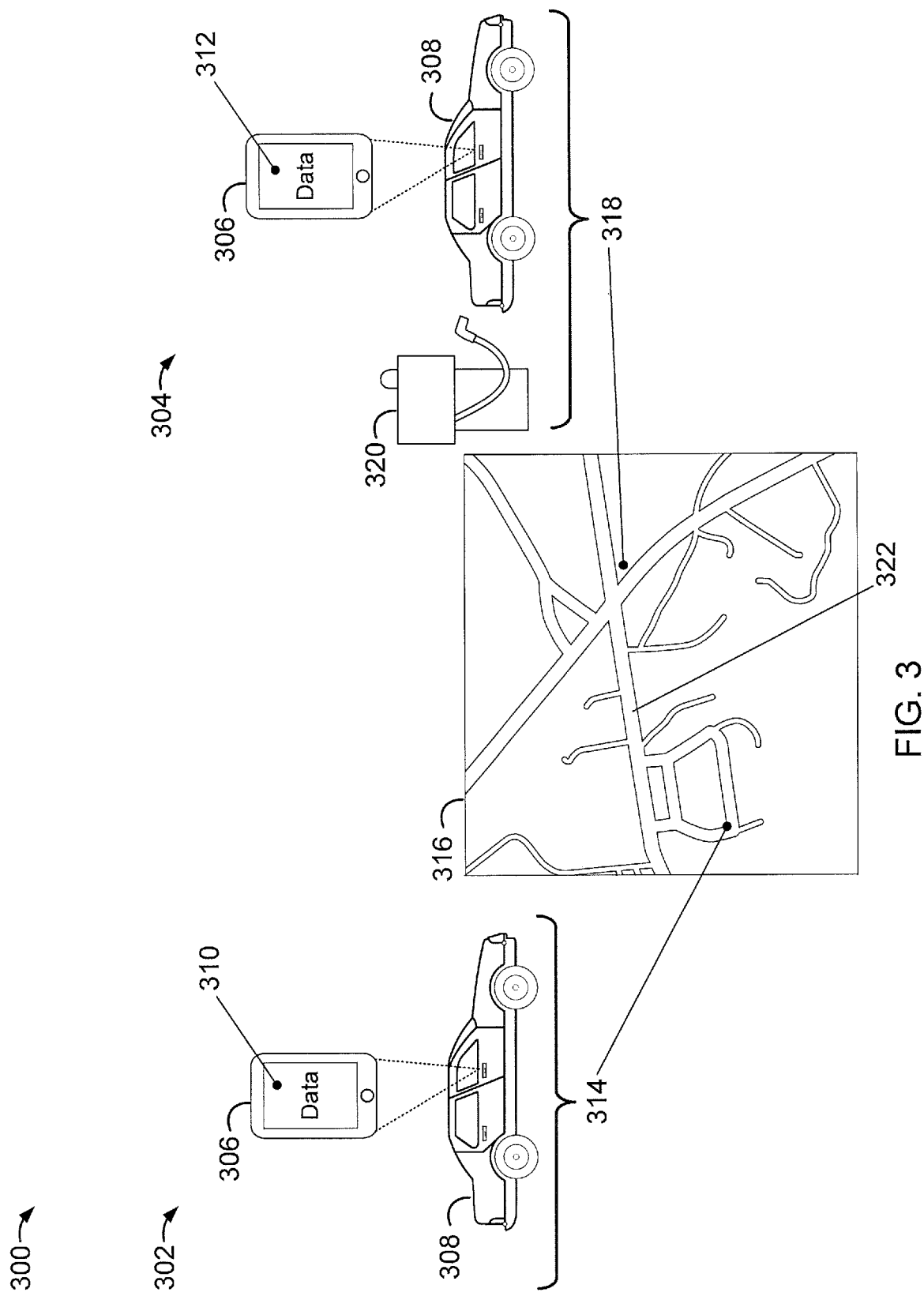
FIG. 3 provides an exemplary system, according to an embodiment.

FIG. 3 is an exemplary system 300, according to an embodiment. As shown, activities 302 and 304 may involve a smartphone 306 and a vehicle 308. For example, considering one or more of the scenarios above, the system 300 may determine the activity 302 of a user leaving a home location and carrying the smartphone 306 to the vehicle 308. Further, the activity 302 may include the user entering the vehicle 308 at a location 314 provided on a map 316 for illustrative purposes. The smartphone 306 may, for example, take the form of any of the client devices described above in relation to FIGS. 1-2B. For example, the client device 306 may take the form of client device 104 such that activity data 310 may be displayed on the user interface 130. Thus, the user interface 130 may include a display component configured to display the activity data 310.

In some embodiments, the system 300 may include a communication interface, a transceiver, a processor, data storage, an authentication circuit/component of a server device that may take the form of the communication interfaces 112 and/or 232, the transceivers 114 and/or 234, the processors 116 and/or 236, the data storage 218 and/or 238, and the authentication circuit/component 120 and/or 240 of the server devices 100 and/or 200, respectively, described above in relation to FIGS. 1-2B.

In some embodiments, the communication interface of the server device may receive the first activity data 310 associated with a first activity 302 of an account and second activity data 312 associated with a second activity 304 of the account. For example, the first activity data 310 may include location data, e.g., GPS data, indicative of the location 314 and/or the location of the vehicle 308. Further, the first activity data 310 may include other data associated with the vehicle 308, e.g., BLUETOOTH data pairing the smartphone 306 with the vehicle 308, and/or other data related to activity 302. The second activity data 312 may include data indicative of a fuel purchase via a fuel dispenser machine 320 of a gas station. Further, the second activity data 312 may include GPS data indicative of the location 318, contact data of the gas station including address and phone data of the gas station.

In some embodiments, the processor of the server device may determine a first location 314 of the first activity 302 from the first activity data 310 and a second location 318 of the second activity 304 from the second activity data 312. As noted, the first location 314 and the second location 318 may be shown on the map 316 for illustration purposes. In some instances, the first location 314 and the second location 318 may be a few miles apart. Further, the authentication circuit of the server device may determine a first authentication of the first activity 302 based at least on the first activity data 310. For example, the authentication circuit may determine the user leaving the home location and carrying the smartphone 306 to the vehicle 308 based on the first activity data 310, e.g., GPS data indicative of the location 314. Further, the authentication circuit of the server device may determine a second authentication of the second activity 304, e.g., the fuel purchase, based on at least one of the first authentication, the first location 314, and/or the second location 318. The transmitter of the communication interface may transmit an indication of the second authentication to a client device, e.g., the smartphone 306. Yet further, the indication of the second authentication may be transmitted to a merchant device, for example, the fuel dispenser 320.

In some embodiments, the authentication circuit may determine the first authentication is a successful authentication of the first activity 302 based at least on the first activity data 310. For example, the authentication circuit may determine the user carrying the smartphone 306 to the vehicle 308 based on the first activity data 310 including GPS data indicative of the location 314. Further, the authentication circuit may determine the second authentication is a successful authentication of the second activity 304 of the fuel purchase, based at least on the successful authentication of the first activity 302 of the user carrying the smartphone 306 to the vehicle 308.

In some embodiments, the processor may determine that the second activity data 312 includes biometric data to authenticate the second activity. In some instances, the user may enter a zip code to the fuel dispenser machine 320 and/or the smartphone 306 to complete the fuel purchase. Yet, in some instances, the user may provide biometric data such as fingerprint data via the fuel dispenser machine 320 and/or the smartphone 306 to complete the fuel purchase. In addition, the authentication circuit may determine the second authentication is a successful authentication of the second activity 304 based at least on the biometric data.

In some embodiments, the authentication circuit may determine a route 322 located between the first location 314 and the second location 318. Further, the authentication circuit may determine the second authentication of the second activity 304 based at least on the route 322. For example, the authentication circuit may determine the route 322 includes one or more stored routes and/or historical routes associated with the account. For example, the route 322 may have been previously taken to complete fuel purchases at one or more fuel dispenser machines 320 at the location 318. Further, the route 322 may have been previously taken to make other purchases, e.g., restaurant food, groceries, and/or other regularly purchased items, in the area surrounding the location 318.

In some embodiments, the authentication circuit may determine the route 322 located between the first location 314 and the second location 318. Further, the authentication circuit may determine a confidence level to authenticate the second activity 304 based at least on the route 322. In some instances, the authentication circuit may determine the confidence level based on the route 322 including the one or more stored routes and/or historical routes. For example, the authentication circuit may determine a high confidence level to authenticate the second activity 304 based on the route 322 including one or more stored routes and/or historical routes. In some embodiments, the authentication circuit may determine the second authentication is a successful authentication of the second activity 304 based at least on the confidence level.

In some embodiments, the authentication circuit may determine various confidence levels based on the route 322 to authenticate activities of the account. For example, the authentication circuit may compare the route 322 with stored routes and/or historical routes associated with the user's account and/or other accounts such as a spouse's accounts and/or a friend's account. The authentication circuit may determine a confidence level based on the route 322 matching one or more portions of the stored routes and/or historical routes and/or the route 322 matching a given percentage of such routes. Further, the authentication circuit may determine the confidence level based on a number of occasions or times in which the user has taken the route 322, possibly to reach one or more locations near the location 318. Yet further, the authentication circuit may determine the confidence level based on the time, the day, and/or the week the user takes the route 322 in comparison to stored and/or historical times, days, and/or weeks associated with such routes. In addition, the authentication circuit may determine the confidence level based on the proximity of the route 322 with the location 314 of the user's home location and/or the location 318 that may be near an office associated with the user's account. Further, the authentication circuit may determine the confidence level based on a calendar event associated with the user's account. In one scenario, the authentication circuit determines the route 322 may be taken to reach the location 318 near the user's dental office for a scheduled appointment on a Thursday morning, for example.

In some embodiments, one or more confidence thresholds may be determined and/or pre-determined to authenticate activities of the account. In some instances, the confidence threshold may be pre-determined by the user and/or the system 300. For example, the confidence threshold may be an eighty-five percent threshold such that the confidence levels associated with an activity must meet or exceed this threshold to authenticate the activity. Thus, in some instances, the authentication circuit may determine the confidence level meets the confidence threshold. Further, in some instances, the authentication circuit may determine the second authentication is a successful authentication of the second activity 304 based at least on the confidence level determined to meet the confidence threshold. In some embodiments, the authentication circuit may determine the confidence level is below a confidence threshold. Further, the authentication circuit may determine the second authentication is a failed authentication of the second activity 304 based at least on the confidence level determined to be below the confidence threshold.

In some embodiments, the confidence threshold may change based on various factors. For example, the confidence threshold may increase based on the activity of the account. The confidence threshold may increase based on the activity including one or more monetary withdrawals from the account. The confidence threshold may decrease based on the activity including one or more money deposits to the account. Further, the confidence threshold may increase or decrease based the activity occurring proximate to the location 314 and/or the user's home location. The confidence threshold may increase or decrease based on the activity occurring proximate to the location 318.

In some embodiments, the authentication circuit may determine the route 322 taken by the smartphone 306 is located between the first location 314 and the second location 318. Further, the authentication circuit may determine that the route 322 indicates one or more stored routes and/or historical routes associated with the account. Yet further, the route 322 may be one of a number of historical routes associated with the account. In some embodiments, the authentication circuit may determine a confidence level to authenticate the second activity 304 based at least on the route 322 indicative of the historical route. Further, the authentication circuit further may determine the second authentication is a successful authentication of the second activity 304 based at least on the determined confidence level, possibly meeting or exceeding a confidence threshold described above.

Figure 4:
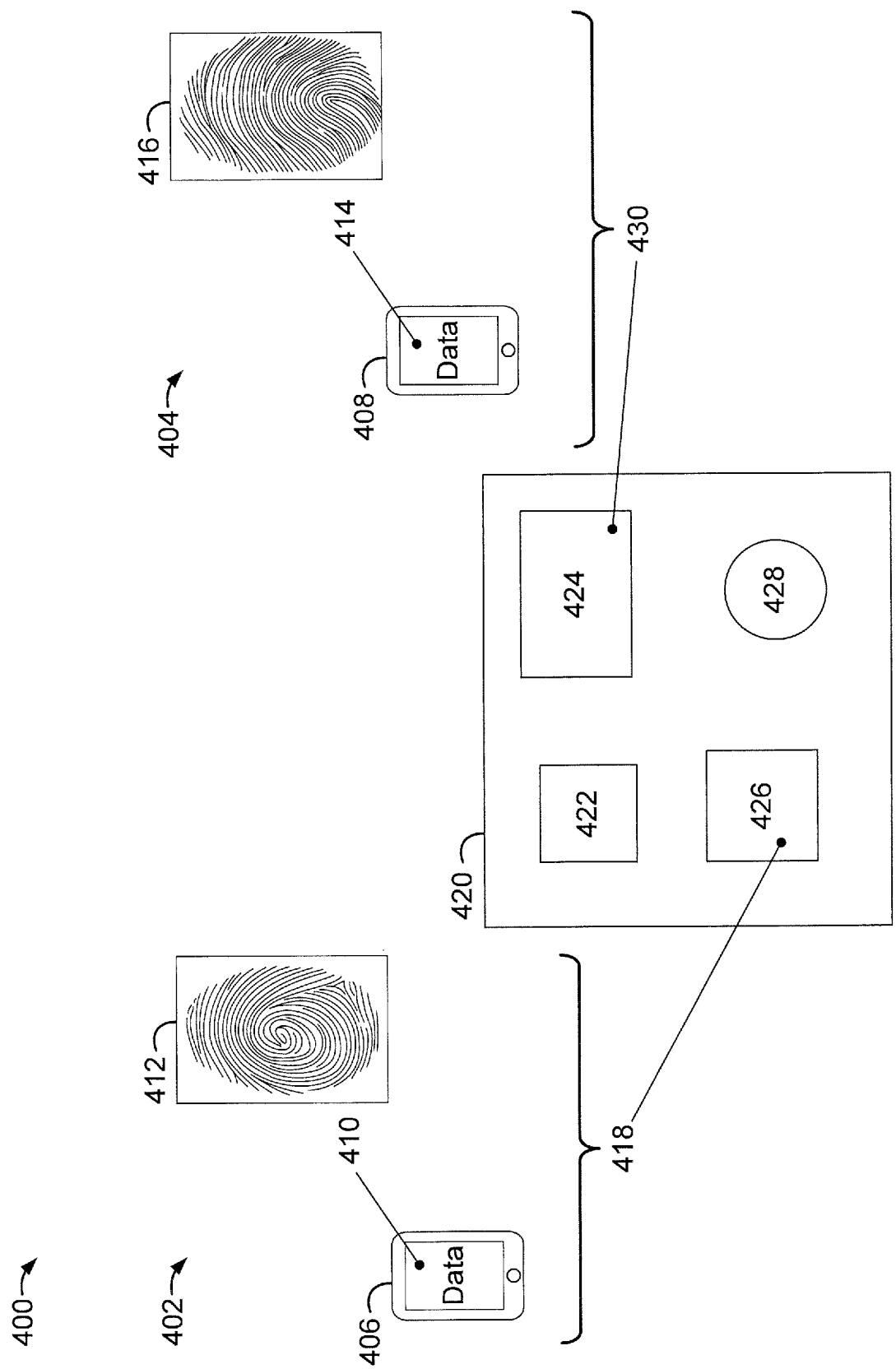
FIG. 4 provides an exemplary system, according to an embodiment.

FIG. 4 is an exemplary system 400, according to an embodiment. As shown, activities 402 and 404 may involve client devices 406 and/or 408. For example, considering one or more of the scenarios above, the system 400 may determine an activity 402 of a user carrying the client device 406, e.g., a smartphone, proximate to structures 422, 424, 426, and/or 428 provided on a map 420 for illustrative purposes. Further, the system 400 may determine an activity of another user, e.g., the user's spouse, carrying the client device 408, e.g., a smartphone, proximate to the structures 420, 422, 424, and/or 426. Further, the system 400 may receive location data of the spouse's location from the smartphone 408. In some instances, based on the relationship between the user's account and the spouse's account, various stores in the structures, e.g., 420, 422, 424, and/or 426, may allow purchases from the user's account and/or the spouse's account using biometric data. For example, the stores may allow purchases by receiving data corresponding to a single thumbprint from the user and/or the spouse, thereby circumventing the need for providing various cards, codes, and/or other forms of account data. Further, in some embodiments, biometric data may be substituted for and/or replaced by other types of authenticating data, such as entry of a PIN number or performance of a gesture.

The smartphones 406 and 408 may, for example, take the form of any of the client devices 104 and 106, respectively, described above in relation to FIGS. 1-3. For example, the client devices 406 and 408 may take the form of client devices 104 and 106, respectively, such that data 410 and 414 may be displayed on the user interfaces 130 and 140, respectively. Thus, the user interfaces 130 and 140 may include display components configured to render the data 410 and 414, respectively.

In some embodiments, the system 400 may include one or more non-transitory computer-readable mediums described above in relation to FIGS. 1-3. Further, the system 400 may include a communication interface, a transceiver, a processor, data storage, and/or an authentication circuit/component of a server device that may take the form of the communication interfaces 112 and/or 232, the transceivers 114 and/or 234, the processors 116 and/or 236, the data storage 118 and/or 238, and/or the authentication circuit/component 120 and/or 240 of the server devices 100 and/or 200, respectively, described above in relation to FIGS. 1-3.

In some embodiments, a non-transitory computer-readable medium of the system 300 may have stored thereon machine-readable instructions. Further, when executed by a server device of the system 300, the instructions may cause the server device to perform operations. In some instances, various operations may include receiving, by a communication interface of the server device, first activity data 410 associated with a first activity 402 of a first account, such as the user's account. Further, various operations may include receiving second activity data 414 associated with a second activity 404 of a second account, such as the spouse's account. In some instances, various operations may include determining, by an authentication circuit of the server device, a relationship between the first account and the second account. For example, the authentication circuit may determine the relationship between the user's account and the spouse's account. In some instances, the accounts may, for example, be associated with a spouse-spouse relationship. Further, the accounts may be linked by one or accounts, balances, and/or funds. Further, the accounts may include smartphone accounts of smartphones 406 and/or 408, possibly indicating that the smartphones 406 and 408 are in close proximity to the structures 422, 424, 426, and/or 428. In some instances, various operations may include determining, by the authentication circuit, an authentication of the second activity 404 based at least on the relationship. In some instances, various operations may include transmitting, by a transmitter of the communication interface, an indication of the authentication of the second activity 404 to a client device such as the smartphones 406 and/or 408. Yet further, the indication of the authentication may be transmitted to a merchant device at one or more of the stores in structures 422, 424, 426, and/or 428.

In some embodiments, the relationship between the first account and the second account may be based on various factors. As noted, the relationship may include a spouse-spouse relationship. Yet further, the relationship may be based on mutual contacts of the user's social account and the spouse's social account. Further, a relationship may include other types of relationships. For example, a relationship may include a parent-child relationship, a parent-parent relationship, a spouse-spouse relationship, a child-child relationship, a friend-friend relationship, and/or other types of relationships. For example, the relationship between the user's account and the spouse's account may include a parent-parent relationship and/or a friend-friend relationship. Further, a relationship between the user's account and a friend's account may be used to authenticate activities of the user's account and/or the friend's account.

In some embodiments, various operations may include determining, by a processor of the server device, that the second activity data 414 includes biometric data 416, e.g., fingerprint and/or voice data, to authenticate the second activity 404. Further, various operations may include determining, by the authentication circuit, the authentication is a successful authentication of the second activity 404 based at least on the biometric data 416 to authenticate the second activity.

In some embodiments, determining the relationship between the first account and the second account may include other operations. For example, various operations may include determining, by a processor of the server device, a first location 418 of the first activity 402 from the first activity data 410 and a second location 430 of the second activity 404 from the second activity data 414. For example, the first activity data 410 and the second activity data 414 may include GPS data indicating the locations 418 and 430, respectively. Further, the first activity data 410 and the second activity data 414 may include store data of stores in structures 426 and 424, respectively, including store location data, store contact data such as a local address, an email address, a website URL, and/or a phone number. Yet further, the first activity data 410 and the second activity data 414 may include first account data and second account data, respectively, including purchasing data, invoice data, product data, shipping data, and/or other data related to the activities 402 and 404, respectively. Further, determining the authentication of the second activity 404 may be based at least on the second location 430 proximately located near the first location 418.

For example, consider the scenario where the system 400 determines a confidence level to authenticate the second activity 404 based on the second location 430 of the spouse's smartphone 408 located proximately near the first location 418 of the user's smartphone 406. In such instances, the confidence level may meet or exceed a confidence threshold to authenticate the second activity 404. In various embodiments, the confidence level and/or the confidence threshold may include the confidence levels and/or confidence thresholds, respectively, described above in relation to FIGS. 1-4.

In some embodiments, determining the relationship between the first account and the second account may include additional operations. For example, various operations may include determining, by a processor of the server device, a first time of the first activity 402 from the first activity data 410 and a second time of the second activity 404 from the second activity data 414. In some instances, the first activity data 410 and the second activity data 414 may include the first time and the second time, respectively, among the other forms of data described above. Further, various operations may include determining, by the authentication circuit, a successful authentication of the first activity 402 based at least on the first activity data 410. For example, the authentication circuit may determine the successful authentication based on the biometric data 412 including fingerprint or voice data of the user. Yet further, various operations may include determining, by the authentication circuit, the authentication is a successful authentication of the second activity 404 based at least on the successful authentication of the first activity and a time difference between the first time and the second time. In some instances, the time difference between the first time and the second time may be a few minutes, approximately less than an hour, a few hours, and/or longer periods of time. Yet, in some instances, the time difference may be a few minutes for the system 400 to determine a confidence level to successfully authenticate the second activity 404.

In some embodiments, various operations may include determining, by the authentication circuit, a confidence level to authenticate the second activity 404. In some instances, the confidence level may be based at least on the relationship between the first account and the second account including the relationship between the user's account and the spouse's account. Further, the confidence level may be based on the relationship between the first location 418 of the first activity 402 and the second location 430 of the second activity 404. For example, the confidence level may range from a forty percent confidence level to a ninety percent confidence level based on the relationship between accounts and the relationship between the first location 418 and the second location 430. Further, the authentication circuit may determine that the confidence level meets a confidence threshold. Yet further, various operations may include determining, by the authentication circuit, the authentication is a successful authentication of the second activity 404 based at least on the confidence level.

In some embodiments, various operations may include determining, by the authentication circuit, a confidence level to authenticate the second activity 404 is below a confidence threshold. For example, considering one or more scenarios above, the confidence level may be a forty percent confidence level that is below the confidence threshold of ninety-five percent. In some instances, the confidence level may be based at least on the relationship between the first account and the second account such as the relationship between the user's account and the spouse's account. Further, the confidence level may be based on the relationship between the first location 418 of the first activity 402 and the second location 430 of the second activity 404. In addition, various operations may include determining, by the authentication circuit, the authentication is a failed authentication of the second activity 404 based at least on the confidence level.

In some embodiments, various operations may include determining, by a processor of the server device, a first location 418 of the first activity 402 from the first activity data 410 and a second location 430 of the second activity 404 from the second activity data 414. In some instances, the first location 418 and the second location 430 may include one or more historical locations and/or stored locations associated with the relationship between the first account and the second account. For example, the first location 418 and the second location 430 may include a historical location such as a shopping mall location, a shopping center location, a recreational park location, and/or another location associated with the relationship. Further, considering one or more scenarios above, the historical location may be associated with the relationship between the user's account and the spouse's account. The historical location may be associated with historical activities authenticated of the user's account and the spouse's account. In some instances, various operations may include determining, by the authentication circuit, a confidence level to authenticate the second activity 404 based at least on the one or more historical locations possibly including the location 418 and/or 430. Further, various operations may include determining, by the authentication circuit, the authentication is a successful authentication of the second activity 404 based at least on the confidence level.

Figure 5:
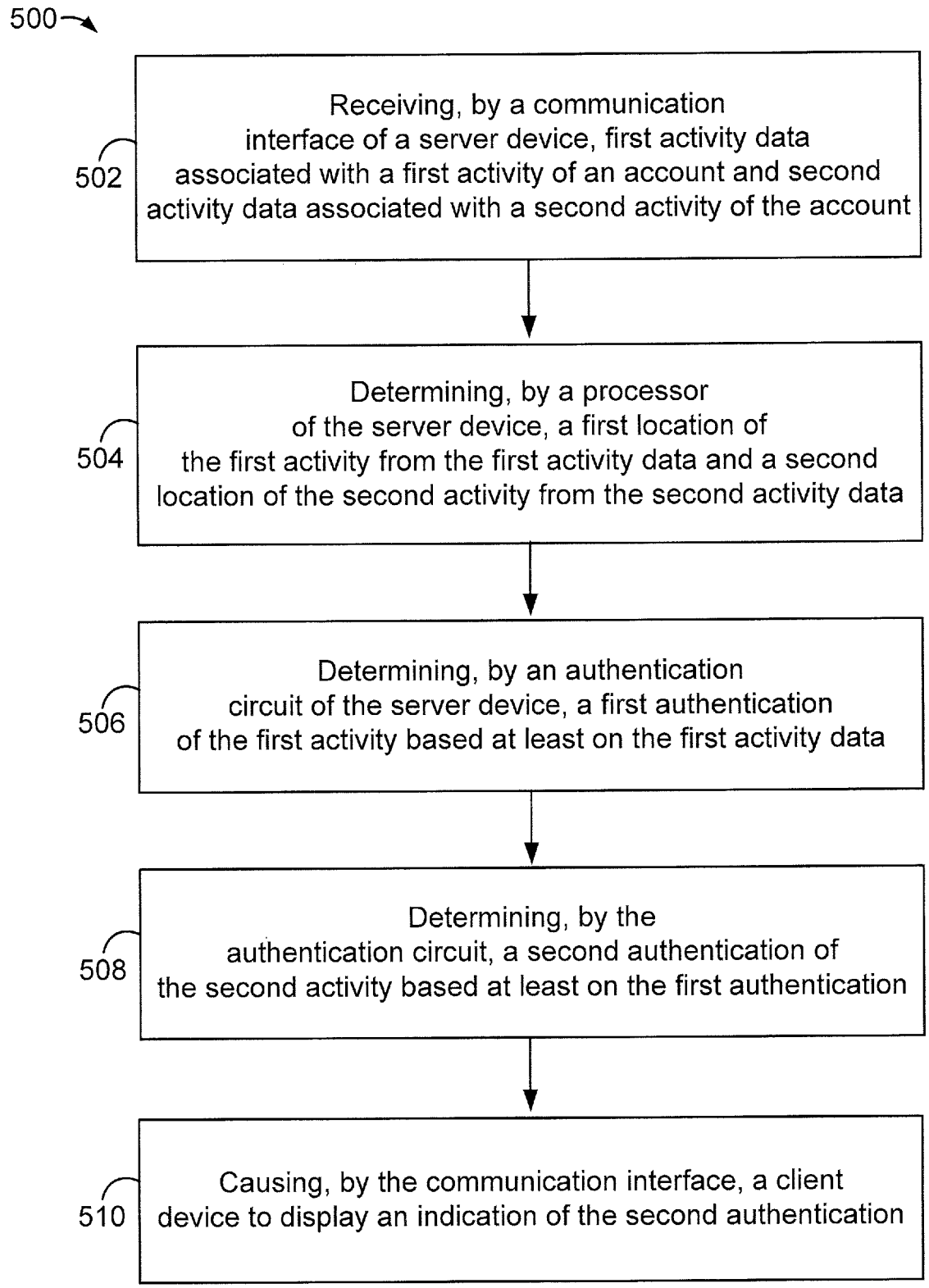
FIG. 5 is a flowchart of an exemplary method for determining authentications of activities, according to an embodiment.

FIG. 5 is a flowchart of an exemplary method 500 for determining authentications of activities, according to an embodiment. Note that one or more steps, processes, and methods described herein may be omitted, performed in a different sequence, and/or combined for various types of applications.

At step 502, the method 500 includes receiving, by a communication interface of a server device, first activity data associated with a first activity of an account and second activity data associated with a second activity of the account. For example, the communication interface of the server device may take the form of the communication interfaces 112 and/or 232 of the server devices 100 and/or 200, respectively, and/or other communication interfaces described above in relation to FIGS. 1-4. In some instances, the communication interface may receive the first activity data 310 and/or 410 associated with the first activity 302 and/or 402, respectively, of an account. Yet further, the communication interface may receive the second activity data 312 and/or 414 associated with a second activity 304 and/or 404, respectively, of the account.

At step 504, the method 500 includes determining, by a processor of the server device, a first location of the first activity from the first activity data and a second location of the second activity from the second activity data. For example, the processor of the server device may take the form of the processors 116 and/or 236 of the server devices 100 and/or 200, respectively, and/or other processors described above in relation to FIGS. 1-4. In some instances, the processor may determine a first location 314 and/or 418 of the first activity 302 and/or 402 from the first activity data 310 and/or 410, respectively. Further, the processor may determine a second location 318 and/or 430 of the second activity 304 and/or 404 from the second activity data 312 and/or 414.

At step 506, the method 500 includes determining, by an authentication circuit of the server device, a first authentication of the first activity based at least on the first activity data. For example, the authentication circuit of the server device may include authentication circuit/component 120 and/or 240 of the server devices 100 and/or 200, respectively, and/or other authentication circuits and/or components described above in relation to FIGS. 1-4. In some instances, the authentication circuit may determine a first authentication of the first activity 302 and/or 402 based at least on the first activity data 310 and/or 410.

At step 508, the method 500 includes determining, by the authentication circuit, a second authentication of the second activity based at least on the first authentication. For example, the authentication circuit may determine a second authentication of the second activity 304 and/or 404 based at least on the first authentication of the first activity 302 and/or 402, respectively. For example, the first authentication of the first activity 302 and/or 402 may correspond to a confidence level for authenticating the second activity 304 and/or 404, respectively.

At step 510, the method 500 includes causing, by the communication interface, a client device to display an indication of the second authentication. For example, the client device may take the form of client devices 306, 320, 406, 408, and/or other client devices described above in relation to FIGS. 1-4. As noted, the client device may take the form of a merchant device, e.g., a tablet device in a merchant store that displays the indication of the second authentication.

Figure 6:
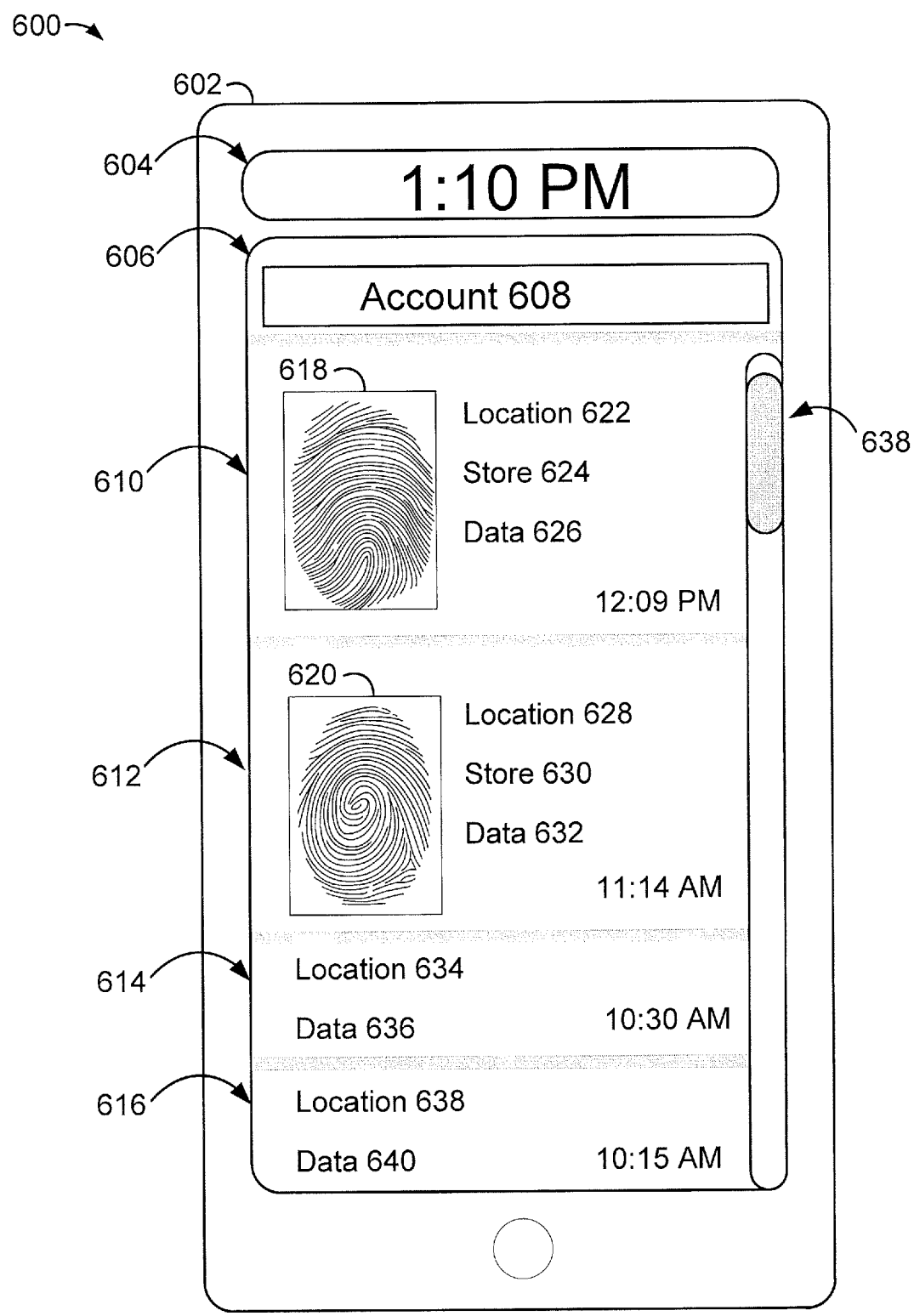
FIG. 6 provides an exemplary client device with a user interface, according to an embodiment.

FIG. 6 provides an exemplary client device 600 with a user interface 602, according to an embodiment. In some instances, the client device 600 may take the form of client devices 306, 420, 406, 408, and/or other client devices described above in relation to FIGS. 1-5. Further, the client device 600 may take the form of a merchant device that displays indications of authentications of account activities.

As shown, the user interface 602 displays a time 604 indicating a current time of "1:10 PM." Further, the user interface 602 displays activity data 606 of an account 608. For example, considering one or more scenarios above, the account 608 may be the user's account. Yet further, the account 608 may be a joint account of the user and the user's spouse. As such, various account activities of the user and/or the spouse may be displayed through the activity data 606. Yet, referring back to FIG. 4, activity data 606 may be separated such that the user's activities 402 are displayed on the user's smartphone 406 and the spouse's activities 404 are displayed on the spouse's smartphone 408.

In some embodiments, the user interface 602 displays activity data 610 that may take the form of the activity data 414 described above in relation to FIG. 4. The activity data 610 may include biometric data 618 that may take the form of the biometric data 416. The activity data 610 may include location data 622 that may indicate the location 430 and/or store data 624 that indicates a store in the structure 424. The activity data 610 may include data 626 of various details of one or more purchases made at the store in the structure 424. As shown, the activity data 610 may also include an indication of the time of the purchase(s) as "12:09 PM."

In some embodiments, the user interface 602 displays activity data 612 that may take the form of the activity data 410. The activity data 612 may include biometric data 620 that may take the form of the biometric data 412. The activity data 612 may include location data 628 that may indicate the location 418 and/or store data 630 that indicates the store in the structure 426. The activity data 612 may include data 632 of various details of one or more purchases made at the store in the structure 426. As shown, the data 612 may also include an indication of the time of the purchase(s) as "11:14 AM."

In some embodiments, the user interface 602 displays activity data 614 that may take the form of the activity data 312. The activity data 614 may include location data 634 that may indicate the location 318 of the fuel dispenser machine 320. The activity data 614 may include data 636 indicating various details of the fuel purchased via the fuel dispenser machine 320. As shown, the data 614 may include the time of the purchase as "10:30 AM."

In some embodiments, the user interface 602 displays activity data 616 that may take the form of the activity data 310. The activity data 616 may include location data 638 that may indicate the location 314, possibly the user's home location and/or the location of the vehicle 308. The activity data 616 may include data 640 indicating various details of authenticating the user as the driver of the vehicle 308. As shown, the activity data 616 may include the time, "10:15 AM," possibly indicating the time the client device 306 proximately senses the vehicle 308. In addition, the user interface 602 includes the scroll 638 to view various other activities associated with the account 608.

Figure 7A:
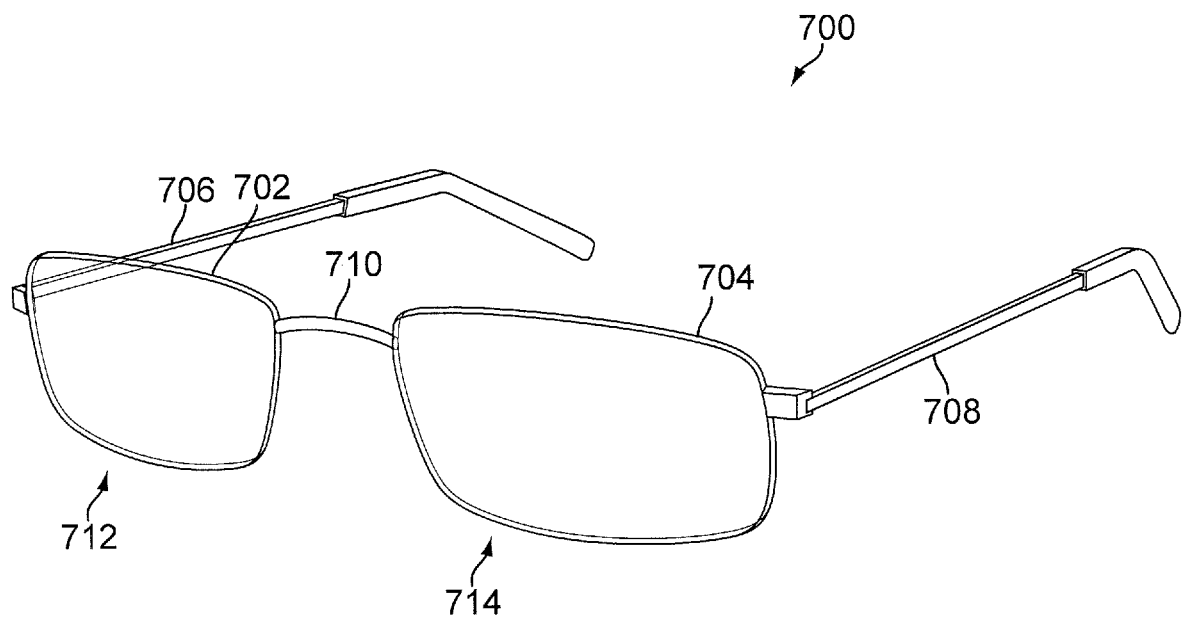
FIG. 7A provides an exemplary client device, according to an embodiment.
Figure 7B:
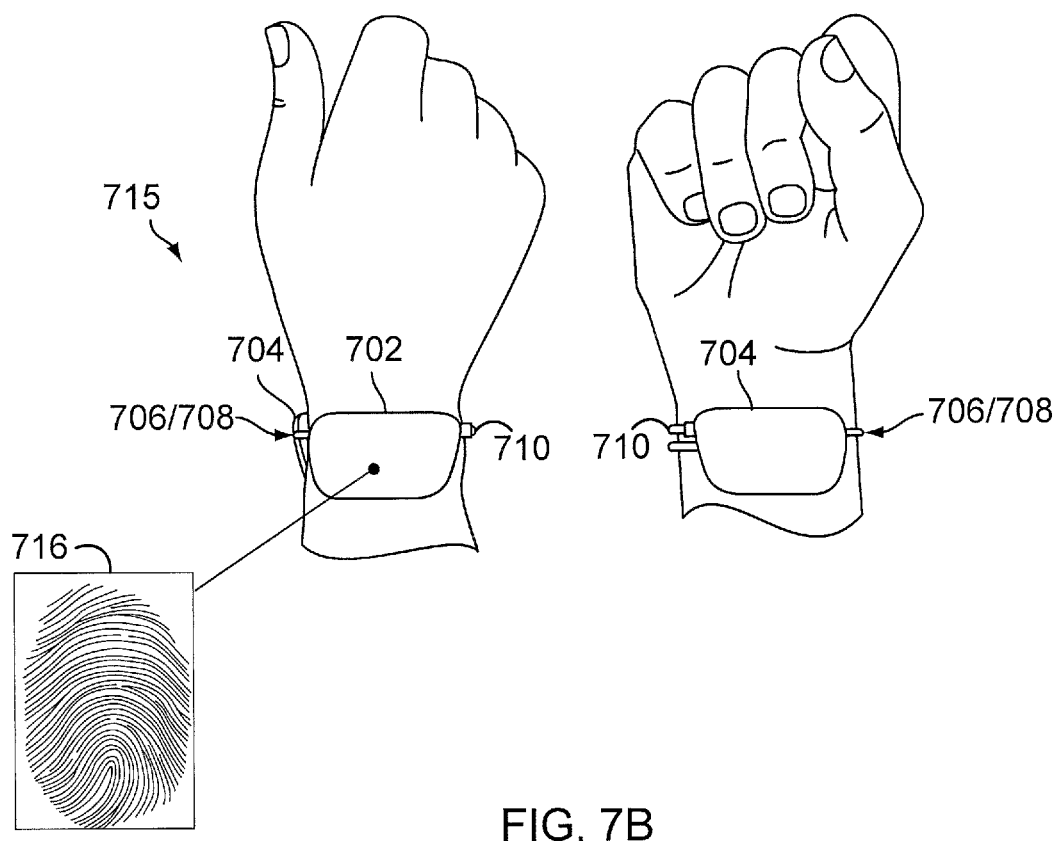
FIG. 7B provides another exemplary client device, according to an embodiment.

FIGS. 7A and 7B provide an exemplary client device 700, according to an embodiment. The client device 700 may take the form of the client device 600 and/or other client devices described above in relation to FIGS. 1-6. As shown, the client device 700 may take the form of a wearable computer. The client device 700 may include a wearable computing device with at least one of a head-mountable display and an arm-mountable display. As shown in FIG. 7A, the client device 700 may take the form of a head-mountable display/device (HMD). The client device 700 may include lenses 702 and 704. The client device 700 may also include a side component 706, a side component 708, and a middle component 710. For example, the computing device 700 may be mountable on a user's head such that the side component 706 rests on one ear of the user and the side component 708 rests on the other ear of the user. Further, the middle component 710 may rest on the nose of the user. In some instances, the lenses 702 and 704 may be positioned in front of the user's eyes. Further, the lenses 702 and 704 may include displays 712 and 714, respectively. In some instances, the displays 712 and 714 may be transparent, partially see-through, and/or configured to provide an augmented reality. Further, the displays 712 and/or 714 may include touch sensing displays.

As shown in FIG. 7B, the client device 700 may take the form of an arm-mountable device. For example, the side components 706 and 708, the middle component 710, and/or the lenses 702 and 704 may be adjustable to fit/mount on an arm and/or wrist 715 of a user. As shown, the lens 702 may be mounted/positioned on the top of the wrist 715. The side components 706, 708, and/or the middle component 710 may be adjusted to fit around the wrist 715. The lens 704 may be mounted/positioned on the bottom of the wrist 715. In some instances, the displays 702 and 704 may include fingerprint sensors configured to receive biometric data 716. As shown, the lens 702 may be configured to receive the biometric data 716, e.g., fingerprint data, that may take the form of the biometric data 618 and/or other biometric data described above in relation to FIGS. 1-6. Further, the lenses 702 and/or 704 may include scanners such as laser scanners configured to scan the eyes of the user to retrieve biometric data from the user's eyes. Yet further, the lenses 702 and/or 704 may be configured to detect one or more patterns of pulses from the wrist 715 of the user.

In some instances, referring back to FIG. 5, the method 500 may include causing the client device to display the indication of an authentication. For example, the client device 700 may display indications of authentications. As noted, for example, the authentication circuit of the server may determine first and second authentications of the first and second activities, respectively. In some instances, the method 600 may include causing the client device 700 to display the indication of the second authentication. As shown, the displays 712 and/or 714 may display the indication of the second authentication to a user wearing the client device 700.

In some embodiments, an authentication scheme may involve one or more forms of biometric data to authenticate activities of an account. In some instances, the authentication scheme may require different forms of biometric data at different locations. For example, a user may wish to make a purchase at a given store. Further, an authentication scheme may cause a merchant device to a request a left thumbprint from the user to authenticate the purchase at the store. Further, another store may request a right thumbprint to authenticate purchases by the user. In some instances, the authentication scheme may require different forms of biometric data at different times. For example, the authentication scheme may require a left thumbprint to authenticate activities on Monday through Thursday. Further, the authentication scheme may require a right thumbprint on Friday through Sunday. As such, the authentication scheme may maintain and/or increase confidence levels for authenticating activities of the account, without the need for providing cards, codes, and/or other forms of account information.

In some embodiments, an authentication scheme may be selected to authenticate activities of an account. For example, a user may select an authentication scheme that requires authentication data of a left and/or right thumbprint, an iris scan of a left and/or right eye, a pattern of pulses, a size/shape of a body, voice recognition, and/or other biometric data. In some instances, the user may select and/or modify the one or more authentication schemes to authenticate the activities of the account. For example, referring back to FIG. 3, the user may select an authentication scheme that requires the left thumbprint to authenticate certain activities such as unlocking the vehicle 308. In particular, the vehicle 308 may include a fingerprint sensor device to receive the thumbprint data. Further, the selected authentication scheme may require an iris scan of the user's right eye to authenticate fuel purchases from the fuel dispenser machine 320. Yet further, the selected authentication scheme may require a given pattern of pulses to authenticate purchases at various stores in the structures 422-428.

Figure 8:
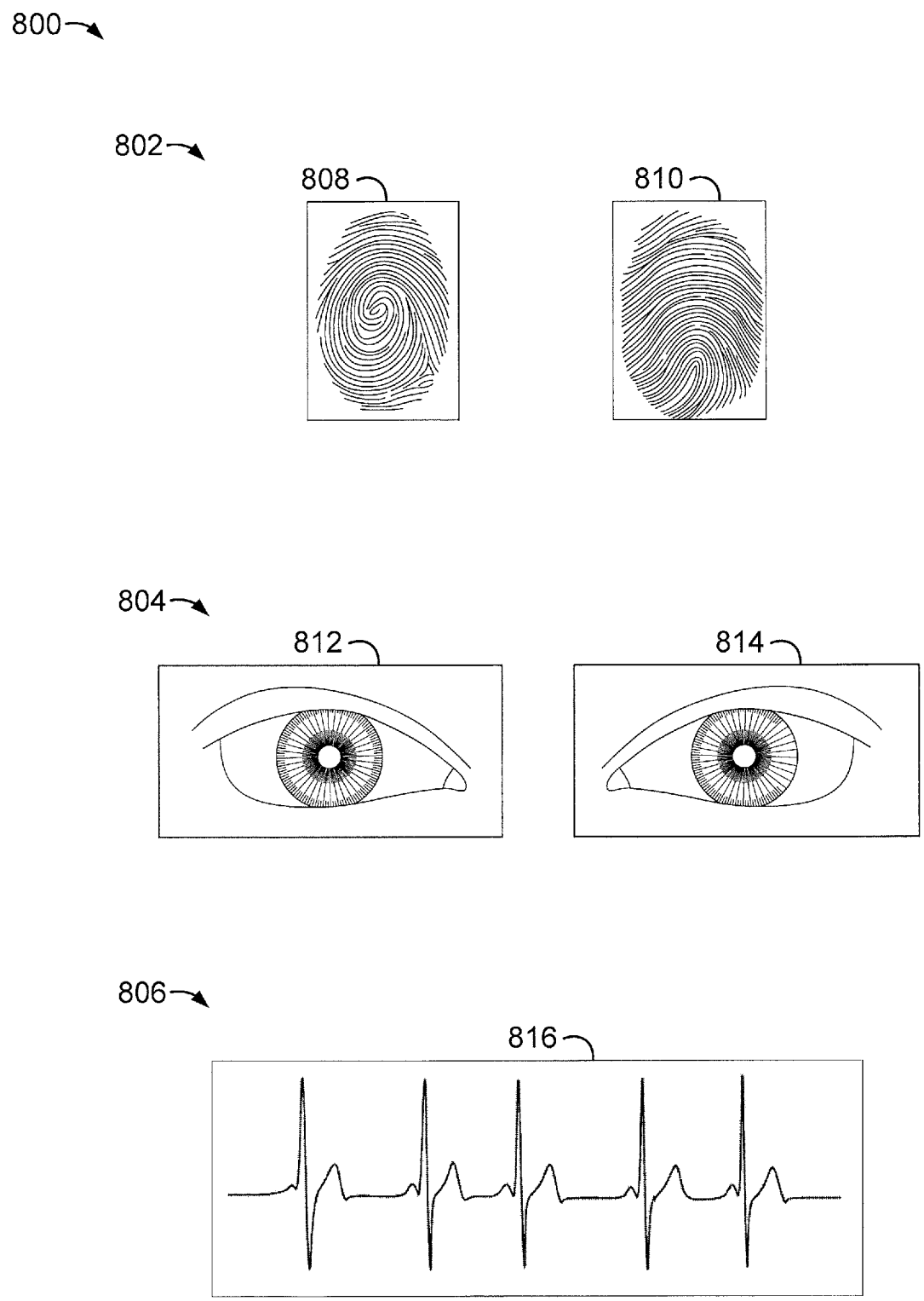
FIG. 8 is an illustration of various authentication schemes, according to an embodiment.

FIG. 8 is an illustration of various authentication schemes 800, according to an embodiment. As shown, one or more authentication schemes 800 may include an authentication scheme 802 that requires biometric data 808 and/or 810. For example, the biometric data 808 and 810 may take the form of the biometric data 412 and 416, respectively, described above in relation to FIG. 4. Further, the biometric data 808 may include fingerprint data of a left finger and the biometric data 810 may include fingerprint data of a right finger. Further, as shown, one or more authentication schemes 800 may include an authentication scheme 804 that requires biometric data 812 and/or 814. For example, the biometric data 812 may include eye and/or iris data of a left eye and the biometric data 814 may include eye and/or iris data of a right eye. In addition, as shown one or more authentication schemes 800 may include an authentication scheme 806 that requires biometric data 816. For example, biometric data 810 may include pulse data, possibly detectable from a user's wrist and/or head.

In some embodiments, a system may determine an authentication scheme. In some instances, the system may include a communication interface, a transceiver, a processor, data storage, and/or an authentication circuit/component of a server device that may take the form of the communication interfaces 112 and/or 232, the transceivers 114 and/or 234, the processors 116 and/or 236, the data storage 118 and/or 238, and/or the authentication circuit/component 120 and/or 240 of the server devices 100 and/or 200, respectively, described above in relation to FIGS. 1-2B. Further, the system may determine the authentication scheme using one or more other circuits/components described above in relation to FIGS. 1-7. For example, the system may determine the authentication scheme via the client device 700 that may take the form of a head-mountable device and/or an arm-mountable device.

In some embodiments, the system may include the communication interface of the server device that receives a selection of an authentication scheme to authenticate activities of an account. For example, the authentication scheme may be selected from the authentication schemes 802, 804, 806, and/or a combination of such schemes. Further, the communication interface may receive activity data associated with a given activity of the account. In some instances, the activity data may take the form of activity data 606, 610, 612, 614, 616, and/or other activity data described above in relation to FIGS. 1-7.

Yet further, a processor of the server device may determine the activity data includes biometric data to authenticate the given activity of the account. In addition, the authentication circuit of the server device may determine the authentication scheme is selected from a number of authentication schemes 800, 802, 804, and/or 806, where the selected authentication scheme requires one or more of biometric data 808, 810, 812, 814, and/or 816 to authenticate the activities of the account. Further, the authentication circuit may determine an authentication of the given activity based at least on one or more of the biometric data 808, 810, 812, 814, and/or 816. Yet further, a transmitter of the communication interface may transmit an indication of the authentication to a client device such as the client device 700.

In some embodiments, the biometric data that authenticates the given activity includes first fingerprint data 808 and second fingerprint data 810. For example, referring back to FIG. 7, the lens 702 may be configured to receive the first fingerprint data 808 and the second fingerprint data 810 to authenticate the given activity. In some embodiments, the biometric data that authenticates the given activity may include at least one of the following: fingerprint data 808 and/or 810, eye data 812 and/or 814, pulse data 816, voice data, body data, and/or other biometric data. The authentication circuit may determine the authentication is a successful authentication of the given activity based at least on the biometric data.

In some embodiments, the selected authentication scheme may be configured to authenticate the activities of the account for a time period. For example, the time period may be a few seconds, minutes, hours, days, weeks, and/or other periods of time. In one scenario, the authentication scheme 802 may be selected to authenticate activities of the account for a time period of few hours and/or days and then the authentication scheme 804 may be selected to authenticate additional activities for a time period of few hours and/or days. In some instances, the authentication circuit may determine from the activity data that the given activity occurred during the time period. The authentication circuit may determine the authentication is a successful authentication of the given activity based at least on the given activity that occurred during the time period.

Figure 9:
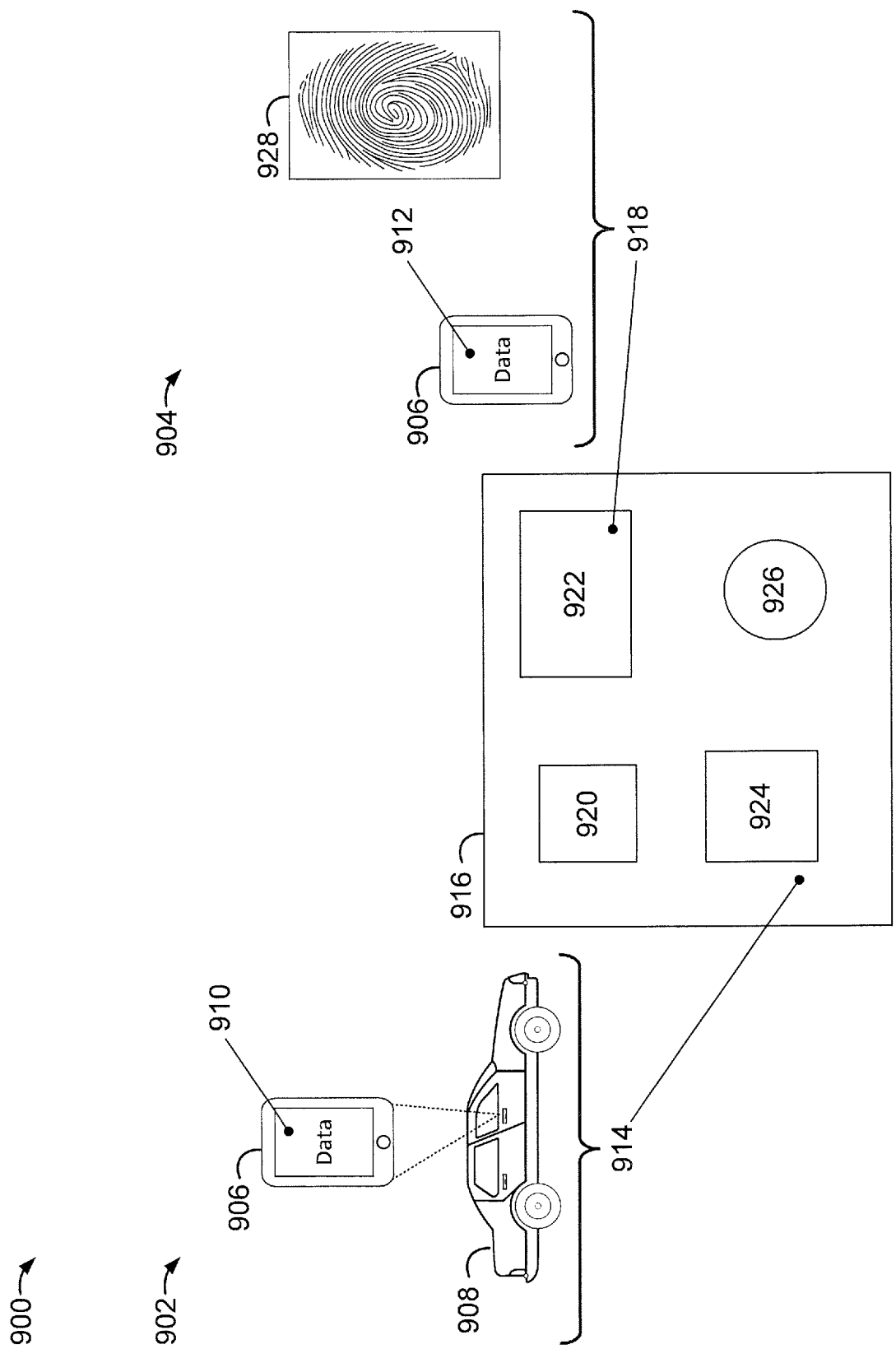
FIG. 9 provides an exemplary system, according to an embodiment.

FIG. 9 is an exemplary system 900, according to an embodiment. As shown, activities 902 and 904 may involve a smartphone 906 and/or a vehicle 908. For example, considering one or more of the scenarios above, the system 900 may determine the activity 902 of a user leaving a home location and carrying the smartphone 906 to the vehicle 908. Further, the activity 902 may include the user entering the vehicle 908 at a location 914 provided on a map 916 for illustrative purposes. Yet further, the activity 902 may include the user carrying the smartphone 906 and driving proximate to structures 920, 922, 924, and/or 926 provided on the map 916. In addition, the activity 904 may include the user carrying the smartphone 906 proximate to structures 920, 922, 924, and/or 926. The smartphone 906 may, for example, take the form of client device 306 in relation to FIG. 3 and/or other client devices described above in relation to FIGS. 1-8. For example, the client device 906 may take the form of client device 104 such that activity data 910 may be displayed on the user interface 130. Thus, the user interface 130 may include a display component configured to display the activity data 910.

In some embodiments, the system 900 may include a communication interface, a transceiver, a processor, data storage, and/or an authentication circuit/component of a server device that may take the form of the communication interfaces 112 and/or 232, the transceivers 114 and/or 234, the processors 116 and/or 236, the data storage 118 and/or 238, and/or the authentication circuit/component 120 and/or 240 of the server devices 100 and/or 200, respectively, described above in relation to FIGS. 1-2B. Further, the system 900 may receive a selection of one or more authentication schemes to authenticate activities 902 and/or 904 of an account. For example, the selected authentication scheme may include one or more authentication schemes 800, 802, 804, and/or 806.

In some embodiments, the selected authentication scheme may be configured to authenticate the activities of the account for a first time period and a second time period. For example, the selected authentication may be configured to authenticate the activity 902 of the account for the first time period. Further, the selected authentication may be configured to authenticate the activity 904 of the account for the second time period. In some instances, the selected authentication scheme may require the authentication data 910 including biometric data to authenticate the activity 902 during the first time period. Further, the authentication scheme may require the authentication data including the biometric data 928 to authenticate the activity 904 during the second time period.

In some embodiments, the selection of the authentication scheme may include an indication of a time period to authenticate the activities of the account. For example, an authentication scheme may be selected and a right thumbprint, e.g., the biometric data 928, may be required to authenticate the activity 904 for a given day while shopping at stores in structures 920, 922, 924, and/or 926. In some instances, the authentication circuit of the system 900 may determine from the activity data 912 that the given activity 904 occurred during the time period. For example, the activity data 912 may include time data of one or more purchases from the stores in the structures 920-926. Further, the authentication circuit may determine the authentication is a successful authentication of the given activity 904 based at least on the given activity 904 occurring during the time period.

In some embodiments, the communication interface of the system 900 may receive second activity data 912 associated with a second activity 904 of the account. For example, consider a scenario where an unauthorized user attempts to purchase items at a store in the structure 922 using second biometric data of the unauthorized user. In some instances, the processor of the system 900 may determine the second activity data 912 includes the second biometric data to authenticate the second activity 904 of the account. Further, the authentication circuit of the system 900 may determine the second authentication is a failed authentication of the second activity 904 based at least on the second biometric data of the unauthorized user. In some embodiments, the authentication circuit may determine a difference between the biometric data 928 and the second biometric data of the unauthorized user. Further, the authentication circuit may determine the second authentication is the failed authentication based at least on the difference between the biometric data 928 and the second biometric data of the unauthorized user.

Figure 10:
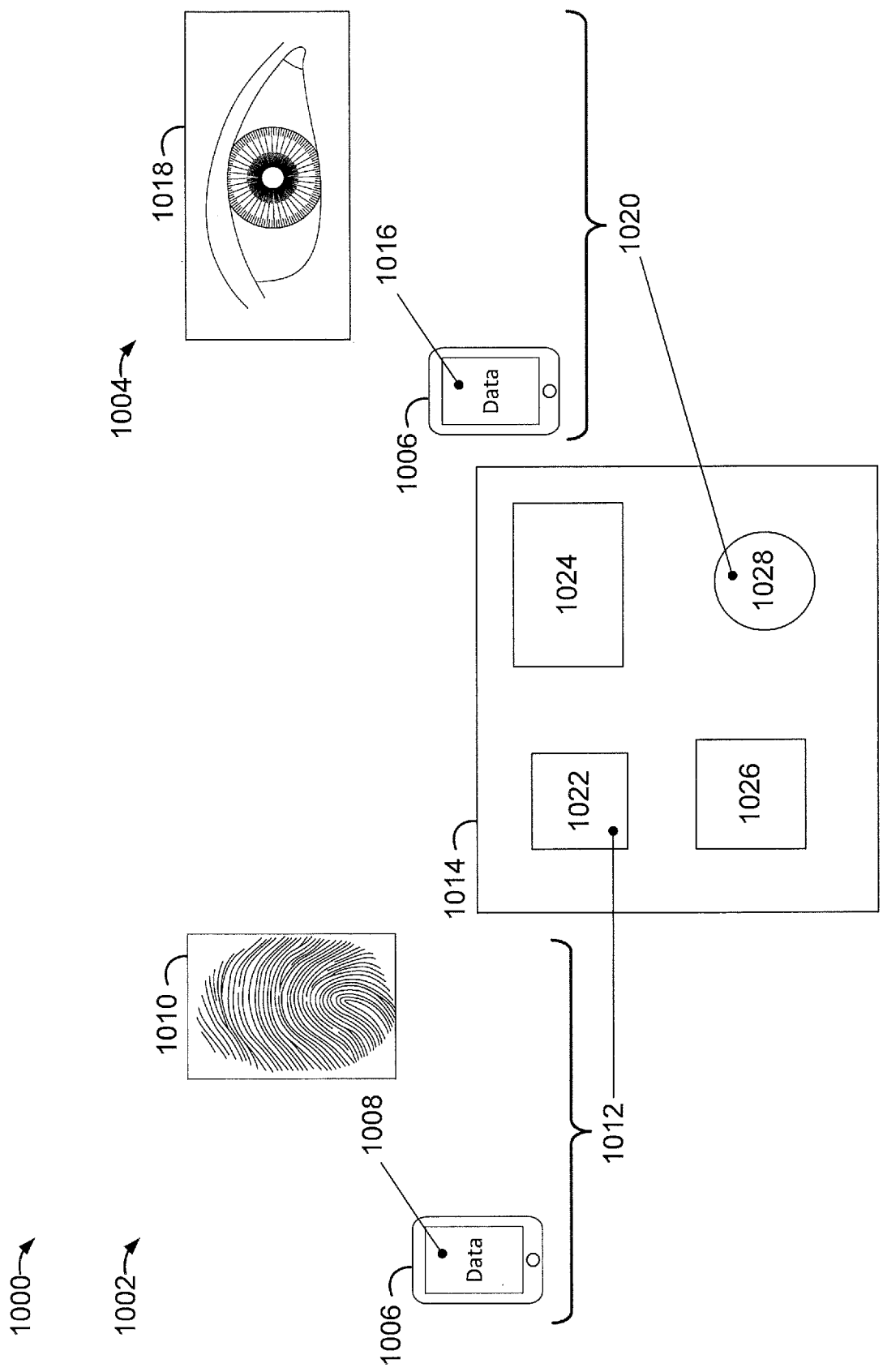
FIG. 10 provides an exemplary system, according to an embodiment.

FIG. 10 is an exemplary system 1000, according to an embodiment. In some embodiments, the system 1000 may include one or more non-transitory computer-readable mediums described above in relation to FIGS. 1-9. Further, the system 1000 may include a communication interface, a transceiver, a processor, data storage, and/or an authentication circuit/component of a server device that may take the form of the communication interfaces 112 and/or 232, the transceivers 114 and/or 234, the processors 116 and/or 236, the data storage 118 and/or 238, and/or the authentication circuit/component 120 and/or 240 of the server devices 100 and/or 200, respectively, described above in relation to FIGS. 1-2B.

As shown, activities 1002 and 1004 may involve a client device 1006 that may, for example, take the form of the client device 906 described above in relation to FIG. 9. For example, considering one or more of the scenarios above, the system 1000 may determine an activity 1002 of a user carrying the client device 1006 at a location 1012 proximate to a structure 1022. As shown, the structures 1022, 1024, 1026, and/or 1028 may be provided on a map 1014 for illustrative purposes. In some instances, the structures 1022, 1024, 1026, and/or 1028 may take the form of the structures 920, 922, 924, and/or 926, respectively, described above in relation to FIG. 9.

In some embodiments, the system 1000 may determine an authentication of the activity 1002 including a purchase at a store in the structure 1022. The system 1000 may determine the authentication based on an authentication scheme that requires biometric data 1010. For example, referring back to FIGS. 8-9, the selected authentication scheme may include the authentication scheme 802 that requires biometric data 808 and/or 810 to authenticate the activity 1002. As shown, the biometric data 1010 may take the form of the biometric data 810 that includes fingerprint data. In some instances, the user may place a finger on a fingerprint sensor of a merchant device in the store to make the purchase. The system 1000 may determine an authentication of the activity 1002 based on the biometric data 1010 received in the activity data 1008, thereby circumventing the need for providing cards, codes, and/or other forms of account data to authenticate the activity 1012 of making one or more purchases.

In some embodiments, the system 1000 may determine an authentication of the activity 1004 that includes a transaction at the structure 1028. In some instances, the structure 1028 may include a bank. Further, the system 1000 may determine the authentication based on a selected authentication scheme that requires biometric data 1018 that may include eye and/or iris data. The authentication scheme may require biometric data 1018 based on the transaction at the structure 1028, possibly for withdrawing money. For example, referring back to FIGS. 8-9, the selected authentication scheme may include the authentication scheme 804 that requires biometric data 812 and/or 814 to authenticate the activity 1004. In some instances, the user may position one or more eyes in front of an eye and/or iris scanner of a merchant device in the bank. The system 1010 may determine the authentication of the activity 1004 based on the biometric data 1018 received in the activity data 1016, thereby circumventing the need for providing cards, codes, and/or other forms of account data to authenticate the activity 1012 of withdrawing money from the account.

In some embodiments, a non-transitory computer-readable medium of the system 1000 may have stored thereon machine-readable instructions. Further, when executed by a server device of the system 1000, the instructions may cause the server device to perform operations. In some instances, various operations may include receiving, by a communication interface of the server device, the activity data 1008 associated with the given activity 1002 of the account. Further, the operations may include determining, by an authentication circuit of the server device, an authentication scheme to authenticate activities of the account, where the authentication scheme requires the biometric data 1010 to authenticate the activities of the account. Yet further, the operations may include determining, by a processor of the server device, the activity data 1008 includes the biometric data 1010 to authenticate the given activity 1002 of the account. In addition, the operations may include determining, by the authentication circuit, an authentication of the given activity 1002 based at least on the biometric data 1010. Further, the operations may include transmitting, by a transmitter of the communication interface, an indication of the authentication to the client device 1006 and/or a merchant device at the store in the structure 1022.

In some embodiments, the authentication scheme may be determined based on a number of factors. In some instances, the authentication scheme may be determined based on a time. For example, the authentication scheme may be determined based on a current time matching a predetermined time. In one scenario, a given authentication scheme may be determined for Monday through Thursday and another authentication scheme may be determined for Friday through Sunday. As shown in FIG. 10, the authentication scheme requiring biometric data 1010 may be determined based on a first time of the activity 1002 occurring within predetermined time period. The biometric data 1010 may include fingerprint data from the left hand data and/or right hand data. Further, the authentication scheme requiring the biometric data 1018 may be determined based on a second time of the activity 1004 occurring within another predetermined time period.

In some embodiments, determining the authentication scheme to authenticate the activities of the account may include determining a current time, a current date, a current day of a week, a current month, a current season, a time of a future event, a date of the future event, a day of the future event, a month of the future event, a season of the future event, a time of a past event, a date of the past event, a day the past event, a month of the past event, and/or a season of the past event. The authentication scheme may be determined based on one or more of the times being within one or more of the time periods. For example, the authentication scheme may be determined based on the current time being within a date of the future event.

In some embodiments, the authentication scheme may be determined based on a location. For example, the authentication scheme requiring biometric data 1010 may be determined based on the location 1012. Further, the authentication scheme requiring the biometric data 1018 may be determined based on the location 1020. In some instances, determining the authentication scheme to authenticate the activities of the account may include determining a current location, a past location, a future location, a location between the client device 1006 and an authorized user of the account, and/or other factors.

In some embodiments, determining the authentication scheme to authenticate the activities of the account may include determining an ambient temperature, a weather forecast at the current location, e.g., the locations 1012 and/or 1020, a weather forecast proximate to a planned location of a planned event, a past weather forecast proximate to a past location of the past event, information on a calendar associated with the account, information accessible via a social networking account associated with the account, biometric statistics associated with the account, noise level or any recognizable sounds detected by the client device 1006, other client devices of the system 1000 such as merchant devices, the other client devices proximate to the client device 1012, and/or the other client devices that are available to communicate with the server device.

In some embodiments, the authentication scheme may be configured to authenticate the activities of the account for a first time period and a second time period. For example, referring back to FIG. 9, the authentication scheme may require biometric data 928 that includes fingerprint data of a left hand to authenticate the activities during the first time period. Yet further, the authentication scheme may require biometric data 1010 that includes fingerprint data of a right hand to authenticate the activities during the second time period.

In some embodiments, the system may determine from activity data that a given activity occurs during a time period. In some instances, various operations may include determining, by the authentication circuit, the authentication scheme is one of a number of authentication schemes of the account. For example, referring back to FIG. 8, the authentication scheme may be one of a number of the authentication schemes 802, 804, 806, and/or a combination of such schemes. The authentication schemes may be configured to authenticate the activities of the account for a time period. Yet further, the operations may include determining from the activity data 1008 that the activity 1002 occurred during the time period. For example, the activity data 1008 may include one or more times, dates, weeks, months, and/or years associated with the activity 1002. In addition, the operations may include determining the authentication is a successful authentication of the given activity 1002 based at least on the activity 1002 occurring during the time period.

In some embodiments, various operations may include determining, by the authentication circuit, the authentication scheme is one of a plurality of authentication schemes of the account. Further, the authentication scheme may be configured to authenticate the activities proximate to the location 1012. Yet further, the operations may include determining from the activity data 1008 that the activity 1002 occurred proximate to the location 1012. In addition, the operations may include determining the authentication is a successful authentication of the given activity 1002 based at least on the given activity 1002 occurring proximate to the location 1012.

In some embodiments, the determined authentication scheme may require the biometric data 1010. For example, various operations may include receiving, by the communication interface, second activity data 1016 associated with a second activity 1004 of the account. Further, the operations may include determining, by the processor, the second activity data 1016 includes second biometric data to authenticate the second activity 1004 of the account. In some instances, the second biometric data may include biometric data 928 that differs from the biometric data 1010 required to authenticate activities of the account. Thus, the operations may include determining, by the authentication circuit, the second authentication is a failed authentication of the second activity 1004 based at least on the second biometric data that differs from the biometric data 1010. In addition, the operations may include determining the second authentication is a successful authentication of the second activity 1004 based at least on determining the second activity data 1016 includes the biometric data 1010.

In some embodiments, the operations may include determining, by the authentication circuit, a difference between the biometric data 1010 and the second biometric data 928. Further, the operations may include determining the second authentication is the failed authentication based at least on the difference between the biometric data 1010 and the second biometric data 928.

Figure 11:
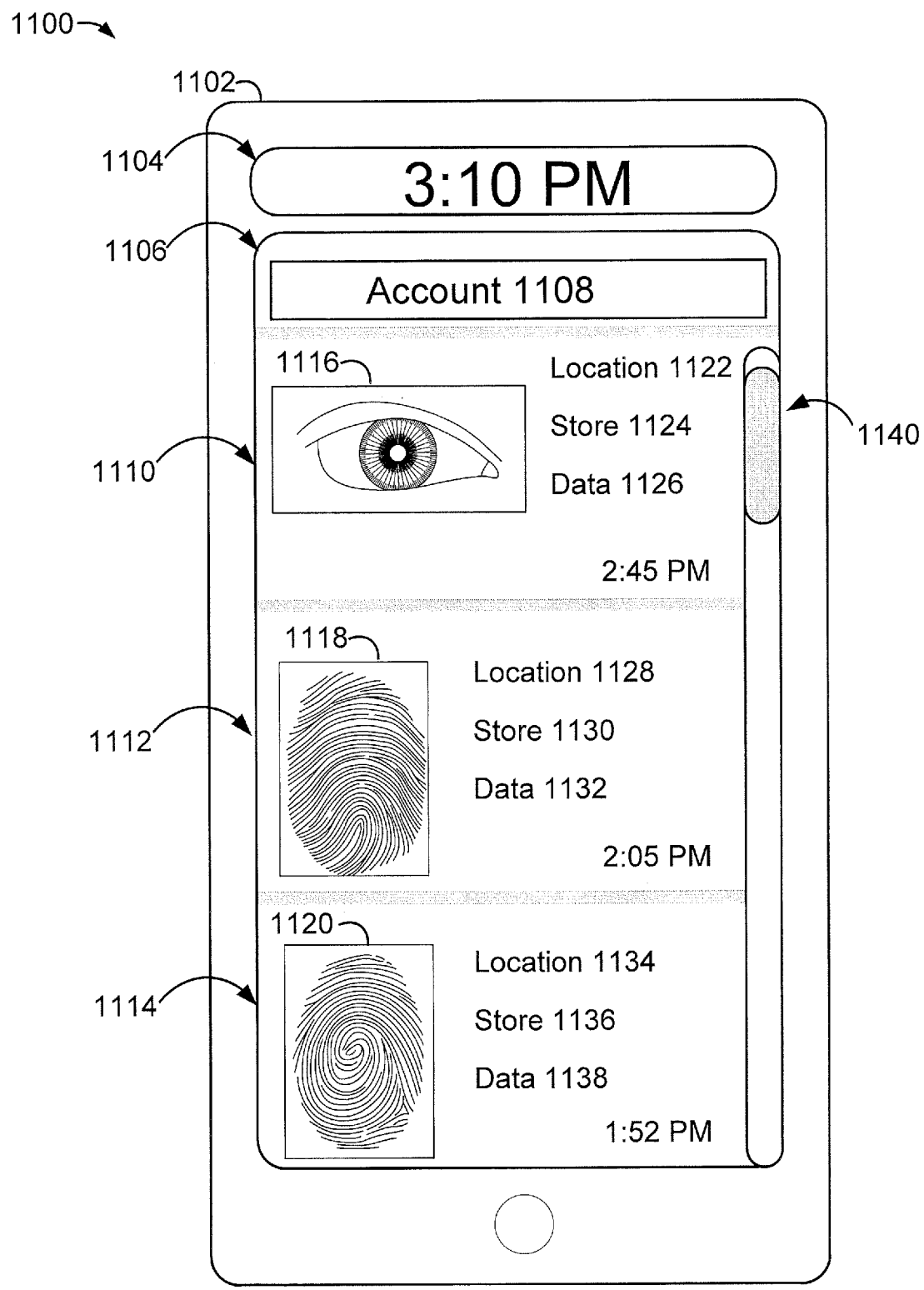
FIG. 11 provides an exemplary client device with a user interface, according to an embodiment.

FIG. 11 provides an exemplary client device 1100 with a user interface 1102, according to an embodiment. In some instances, the client device 1100 may take the form of client device 600, 700, and/or other client devices described above in relation to FIGS. 1-10. Further, the client device 1100 may take the form of a merchant device that displays indications of authentications.

As shown, the user interface 1102 displays a time 1104 indicating a current time of "3:10 PM." Further, the user interface 1102 displays activity data 1106 of an account 1108. For example, considering one or more scenarios above, the account 1108 may be the user's account. As such, various activities of the user's account 1108 may be displayed through the activity data 1106.

In some embodiments, the user interface 1102 displays activity data 1110 that may take the form of the activity data 1016 described above in relation to FIG. 10. The activity data 1110 may include biometric data 1116 that may take the form of the biometric data 1018. The activity data 1110 may include location data 1122 that may indicate the location 1020 and/or store data 1124 that indicates the store in the structure 1028. The activity data 1110 may include data 1126 of various details of one or more purchases made at the store in the structure 1028. As shown, the activity data 1110 may also include an indication of the time of the purchase(s) as "2:45 PM."

In some embodiments, the user interface 1102 displays activity data 1112 that may take the form of the activity data 1008. The activity data 1112 may include biometric data 1118 that may take the form of the biometric data 1010. The activity data 1112 may include location data 1128 that may indicate the location 1012 and/or store data 1130 that indicates the store in the structure 1022. The activity data 1112 may include data 1132 of various details of one or more purchases made at the store in the structure 1022. As shown, the activity data 1112 may also include an indication of the time of the purchase(s) as "2:05 PM."

In some embodiments, the user interface 1102 displays activity data 1114 that may take the form of the activity data 912. The activity data 1114 may include location data 1134 that may indicate the location 918 and/or store data 1136 that indicates store data 1136 that may indicate the store in the structure 922. The activity data 1114 may include data 1138 of various details of one or more purchases made at the store in the structure 922. As shown, the activity data 1114 may include the time of the purchase as "1:52 PM." In addition, the user interface 1102 includes the scroll 1140 to view various other activities associated with the account 1108. For example, the user interface 1102 may display the activity data 910 associated with the activity 902.

Figure 12:
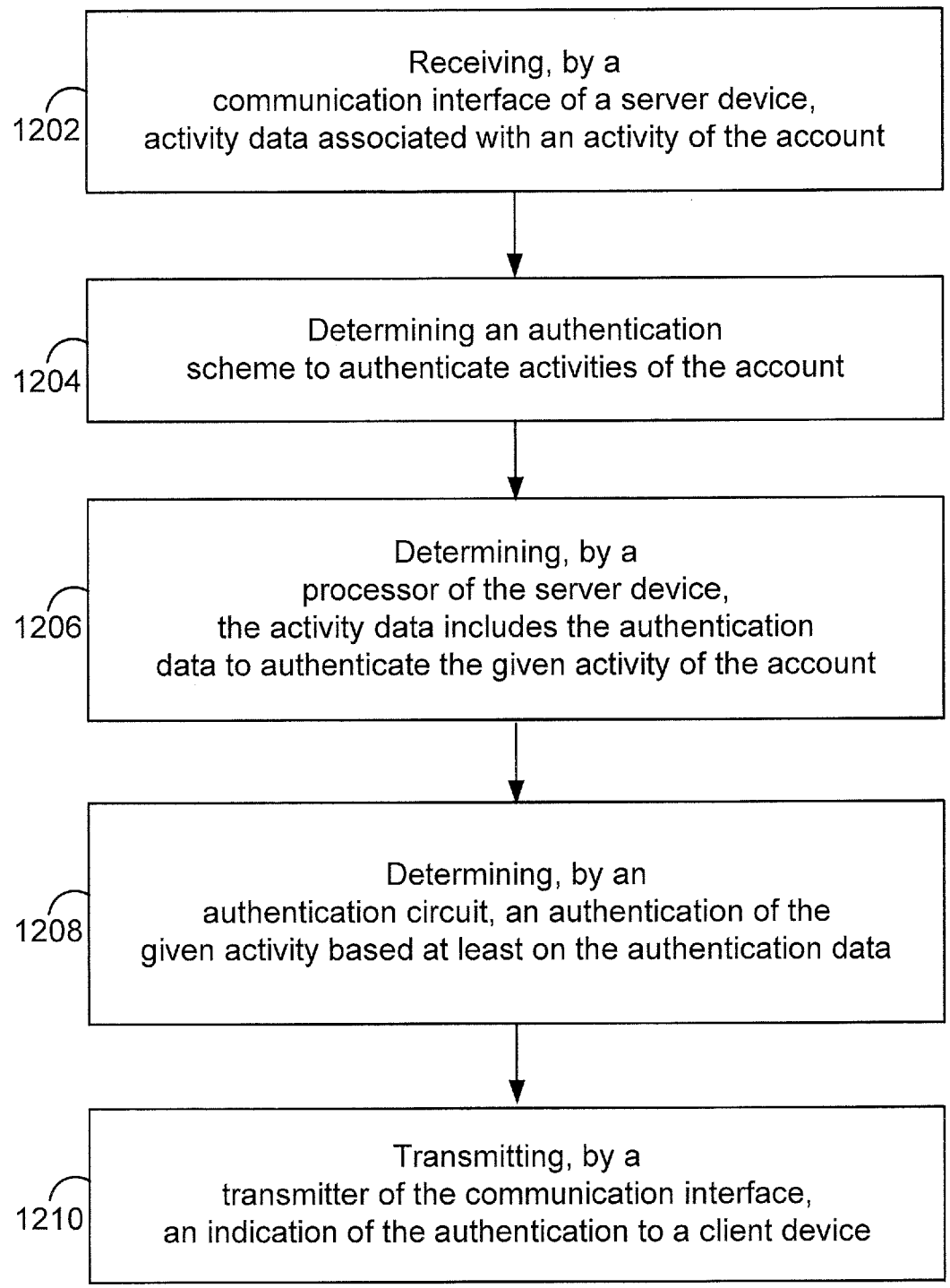
FIG. 12 is a flowchart of an exemplary method for determining an authentication scheme to authenticate activities.

FIG. 12 is a flowchart of an exemplary method 1200 for determining an authentication scheme to authenticate activities, according to an embodiment. Note that one or more steps, processes, and methods described herein may be omitted, performed in a different sequence, and/or combined for various types of applications.

At step 1202, the method 1200 may include receiving, by a communication interface of a server device, activity data associated with an activity of the account. For example, the communication interface of the server device may take the form of the communication interfaces 112 and/or 232 of the server devices 100 and/or 200, respectively, and/or other communication interfaces described above in relation to FIGS. 1-11. In some instances, the communication interface may receive the activity data 910 and/or 912 associated with the activity 902 and/or 904, respectively, of the account. Yet further, the communication interface may receive the activity data 1008 and/or 1016 associated with the activity 1002 and/or 1004, respectively, of the account.

At step 1204, the method 1200 may include determining an authentication scheme to authenticate activities of the account, where the authentication scheme requires authentication data to authenticate the activities of the account. The authentication scheme may be determined in any manner described above in relation to FIGS. 8-11. In some instances, the authentication scheme may be determined based on the activity of the account. For example, the authentication scheme 802 may be determined to authenticate purchases at one or more stores. Further, the authentication scheme 804 may be determined to authenticate transactions with the account such as withdrawals from the account at a bank and/or an ATM machine. In some instances, a combination of the authentication schemes 802-806 may be determined to authenticate various activities of the account. For example, an authentication scheme may require a left thumbprint for authenticating various activities and a right thumbprint for authenticating other activities.

In some embodiments, the authentication data may include account data, e.g., ATM card data, credit card data, identification card data such as driver's license data, a PIN number, a zip code, a password, and/or other forms of account data. In some embodiments, the authentication data may include biometric data. For example, the authentication data may include biometric data 808-816 as described above in relation to FIGS. 8-11. In some instances, and the biometric data 808 may include left finger data and the biometric data 810 may include right finger data.

At step 1206, the method 1200 may include determining, by a processor of the server device, the activity data includes the authentication data to authenticate the given activity of the account. For example, the processor of the server device may take the form of the processors 116 and/or 236 of the server devices 100 and/or 200, respectively, and/or other processors described above in relation to FIGS. 1-11. Referring back to FIG. 10, the processor may determine that the activity data 1008 includes the authentication data, e.g., biometric data 1010, to authenticate the given activity 1002 of the account. Further, the processor may determine that the activity data 1016 includes the authentication data, e.g., 1018, to authenticate the given activity 1004 of the account.

At step 1208, the method 1200 may include determining, by an authentication circuit, an authentication of the given activity based at least on the authentication data. For example, the authentication circuit of the server device may include authentication circuit/component 120 and/or 240 of the server devices 100 and/or 200, respectively, and/or other authentication circuits/components described above in relation to FIGS. 1-4. In some instances, the authentication circuit may determine the authentication of the given activity 1002 based on the authentication data 1008 that may include the biometric data 1010. Further, the authentication circuit may determine the authentication of the given activity 1004 based on the authentication data 1016 that may include the biometric data 1018.

At step 1210, the method 1200 may include transmitting, by a transmitter of the communication interface, an indication of the authentication to a client device. For example, the client device may take the form of client devices 700, 906, 1006, and/or other client devices described above in relation to FIGS. 1-11. As noted, the client device may take the form of a merchant device, e.g., a tablet device in a merchant store that displays the indication of the authentication. For example, the merchant device may display the indications of the authentications similar to that of the user interface 1102 described above in relation FIG. 11.

In some embodiments, the authentication scheme may be configured to authenticate the activities of the account for a first time period and a second time period. For example, referring back to FIGS. 9 and 10, the authentication scheme may authenticate the activity 904 for a first time period and the activity 1002 for a second time period. In some instances, the authentication scheme may require left finger data, e.g., biometric data 928, to authenticate the activities 904 during the first time period. Further, the authentication scheme may require right finger data, e.g., the biometric data 1010, to authenticate the activities 1002 during the second time period.

In some embodiments, the method 1200 may include determining, by the authentication circuit, the authentication scheme is one of a number of authentication schemes of the account. For example, referring back to FIGS. 8-9, the authentication scheme may be one of a number of authentication schemes 802, 804, and/or 806. In some instances, the authentication scheme may be configured to authenticate the activities 904 of the account for a time period. The time period may include one or more time periods described above in relation to FIGS. 8-11. Further, the method 1200 may include determining from the activity data 912 that the given activity 904 occurred during the time period and determining the authentication is a successful authentication of the given activity 904 based at least on the given activity 904 occurring during the time period.

In some embodiments, a system may include a communication interface of a server device with means for receiving a selection of an authentication scheme to authenticate activities of an account and receiving activity data associated with a given activity of the account. The system may include a processor of the server device with means for determining the activity data includes biometric data to authenticate the given activity of the account. The system may include an authentication circuit of the server device with means for determining the authentication scheme is selected from a plurality of authentication schemes, where the selected authentication scheme requires the biometric data to authenticate the activities of the account. The system may include the authentication circuit of the server device with means for determining an authentication of the given activity based at least on the biometric data. The system may include a transmitter of the communication interface with means for transmitting an indication of the authentication to a client device.

In some embodiments, a system may include a communication interface of a server device with means for receiving first activity data associated with a first activity of an account and second activity data associated with a second activity of the account. The system may include a processor of the server device with means for determining a first location of the first activity from the first activity data and a second location of the second activity from the second activity data. The system may include an authentication circuit of the server device with means for determining a first authentication of the first activity based at least on the first activity data. The system may include the authentication circuit of the server device with means for determining a second authentication of the second activity based on at least one of the first authentication, the first location, and the second location. The system may include a transmitter of the communication interface with means for transmitting an indication of the second authentication to a client device.

The above details description describes various features and functions of the disclosed systems, devices, mediums, and/or methods with reference to the accompanying figures. It should be readily understood that the aspects of the present disclosure, as generally described herein, and illustrated in the figures, can be arranged, substituted, combined, separated, and designed in a wide variety of different configurations, all of which may be contemplated herein.

With respect to any or all of the message flow diagrams, scenarios, and flow charts in the figures and as discussed herein, each step, block and/or communication may represent processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage media.

The computer-readable medium may also include non-transitory computer-readable media such as media that stores data for short periods of time like register memory, processor cache, and/or random access memory (RAM). The computer-readable medium may also include non-transitory computer-readable media such as media that may store program code and/or data for longer periods of time, such as secondary or persistent long term storage, like read-only memory (ROM), optical or magnetic disks, and/or compact-disc read only memory (CD-ROM), for example. Thus, various forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. Moreover, a step or block that represents one or more information transmissions may correspond to information transmissions between software and/or hardware modules in the same physical device. Further, other information transmissions may be between software modules and/or hardware modules in different physical devices.

In various embodiments of the present disclosure, execution of instruction sequences to practice the present disclosure may be performed by a computer system. In various other embodiments of the present disclosure, a plurality of computer systems coupled by a communication link to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure and the accompanying figures may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A method, comprising:
   monitoring, at least in part via one or more location sensors of an apparatus of a user, a joint movement of a mobile device of the user and a vehicle of the user;
   detecting, based on the monitoring, that the user has moved from a first location to a second location;
   determining a route of the user based on the detecting;
   determining, at least in part based on the route, a first activity of the user at the second location;
   accessing historical activity data associated with the user, the historical activity data including historical routes associated with the user;
   determining, based on the historical activity data, that after engaging in the first activity previously, the user had been granted an access to an account of the user when multiple authentication credentials were received from the user;
   receiving a subset of the multiple authentication credentials but not information pertaining to a funding source of the user; and
   granting, to the user, the access to the account in response to the receiving the subset of the authentication credentials but not the information pertaining to the funding source of the user, wherein the granting is based on the determining that after engaging in the first activity previously, the user had been granted the access to the account.

2. The method of claim 1, wherein the apparatus comprises the mobile device or the vehicle.

3. The method of claim 2, wherein the apparatus comprises both the mobile device and the vehicle.

4. The method of claim 1, wherein:
   the one or more location sensors comprise a Global Positioning System (GPS) sensor;
   the first location comprises a home of the user; and
   the second location comprises a place of business.

5. The method of claim 1, further comprising: displaying, on an interface of the apparatus, an association between the first activity, the first location or the second location, and the multiple authentication credentials.

6. The method of claim 1, wherein the apparatus is a first mobile device of a first user, and wherein the method further comprises:
   determining, while the first mobile device is at the second location, that a second mobile device is within a predefined distance of the first mobile device and is associated with the first mobile device; and
   thereafter granting, to the second mobile device, the access to the account of the first user without receiving the multiple authentication credentials.

7. The method of claim 6, wherein the second mobile device is a device of a second user different from the first user.

8. The method of claim 1, wherein the multiple authentication credentials include an account identifier or password, and wherein the subset of the authentication credentials does not include the account identifier or the password.

9. The method of claim 1, wherein the determining that the user had been granted the access to the account of the user further comprises determining that the user was successfully authenticated while the apparatus remained at the second location for at least a predetermined amount of time.

10. A system, comprising:
    a non-transitory memory; and
    one or more hardware processors coupled to the non-transitory memory and configured to read instructions from the non-transitory memory to cause the system to perform operations comprising:
       monitoring, at least in part via one or more location sensors of an apparatus of a user, a joint movement of a mobile device of the user and a vehicle of the user;
       detecting, based on the monitoring, that the user has moved from a first location to a second location;
       determining a route of the user based on the detecting;
       determining, at least in part based on the route, a first activity of the user at the second location;
       accessing historical activity data associated with the user, the historical activity data including historical routes associated with the user;
       determining, based on the historical activity data, that after engaging in the first activity previously, the user had been granted an access to an account of the user when multiple authentication credentials were received from the user;
       receiving, from the user at the second location, a subset of the multiple authentication credentials without receiving funding source information of the user; and granting, to the user, the access to the account at the second location in response to the receiving of the subset of the authentication credentials without receiving funding source information of the user, wherein the granting is based on the determining that after engaging in the first activity previously, the user had been granted the access to the account.

11. The system of claim 10, wherein the apparatus comprises the mobile device or the vehicle.

12. The system of claim 11, wherein the apparatus comprises both the mobile device and the vehicle.

13. The system of claim 10, wherein:
the one or more location sensors comprise a Global Positioning System (GPS) sensor;
the first location comprises a home of the user; and
the second location comprises a place of business.

14. The system of claim 10, wherein the operations further comprise: displaying, on an interface of the apparatus, an association between the first activity, the first location or the second location, and the authentication credentials.

15. The system of claim 10, wherein the apparatus is a first mobile device of a first user, and wherein the operations further comprise:
determining, while the first mobile device is at the second location, that a second mobile device of a second user different from the first user is within a predefined distance of the first mobile device and is associated with the first mobile device; and
thereafter granting, to the second mobile device, the access to the account of the first user without receiving the multiple authentication credentials.

16. The system of claim 10, wherein the multiple authentication credentials include an account identifier or password, and wherein the subset of the authentication credentials does not include the account identifier or the password.

17. The system of claim 10, wherein the determining that the user had been granted the access to the account of the user further comprises determining that the user was successfully authenticated while the apparatus remained at the second location for at least a predetermined amount of time.

18. A non-transitory machine-readable medium having stored thereon machine-readable instructions executable to cause a machine to perform operations comprising:
monitoring, at least in part via one or more location sensors of an apparatus of a user, a joint movement of a mobile device of the user and a vehicle of the user;
detecting, based on the monitoring, that the user has moved from a first location to a second location;
determining a route of the user based on the monitoring and the detecting;
based on the detecting and the determined route, determining a first activity of the user;
accessing historical activity data associated with the user, the historical activity data including historical routes associated with the user;
determining, based on the historical activity data, that after engaging in the first activity previously, the user was authorized to access to an account of the user a plurality of times,
wherein a plurality of types of authentication credentials was received from the user each time the user was authorized to access the account;
receiving a subset of the plurality of types of the authentication credentials without receiving credit card information or automated teller machine (ATM) card information of the user; and
authorizing, for the user, the access to the account at the second location after the subset of the authentication credentials is received, wherein the authorizing is performed based on the determining that after engaging in the first activity previously, the user had been authorized to access the account of the user a plurality of times.

19. The non-transitory machine-readable medium of claim 18, wherein:
the one or more location sensors comprise a Global Positioning System (GPS) sensor;
the first location comprises a home of the user; and
the second location comprises a location other than the home of the user.

20. The non-transitory machine-readable medium of claim 18, wherein the operations further comprise: displaying, on an interface of the apparatus, an association between the first activity, the first location or the second location, and the plurality of types of the authentication credentials.

* * * * *